US010495274B2

(12) United States Patent
Chien

(10) Patent No.: US 10,495,274 B2
(45) Date of Patent: Dec. 3, 2019

(54) AC POWER SOURCE LED LIGHT HAS MOVING IMAGE OR-AND PATTERNS PROJECTION

(71) Applicant: Tseng-Lu Chien, Walnut, CA (US)

(72) Inventor: Tseng-Lu Chien, Walnut, CA (US)

(*) Notice: Subject to any disclaimer, the term of this patent is extended or adjusted under 35 U.S.C. 154(b) by 121 days.

(21) Appl. No.: 15/730,291

(22) Filed: Oct. 11, 2017

(65) Prior Publication Data
US 2018/0119908 A1  May 3, 2018

Related U.S. Application Data

(60) Continuation-in-part of application No. 14/968,862, filed on Dec. 14, 2015, now Pat. No. 9,910,095,
(Continued)

(51) Int. Cl.
*F21S 8/00* (2006.01)
*F21V 14/08* (2006.01)
(Continued)

(52) U.S. Cl.
CPC .............. *F21S 8/035* (2013.01); *F21K 9/232* (2016.08); *F21S 4/28* (2016.01); *F21S 9/02* (2013.01); *F21S 10/002* (2013.01); *F21S 10/007* (2013.01); *F21V 5/04* (2013.01); *F21V 13/02* (2013.01); *F21V 14/003* (2013.01); *F21V 14/006* (2013.01); *F21V 14/06* (2013.01); *F21V 14/08* (2013.01); *F21V 17/02* (2013.01); *F21V 21/08* (2013.01); *F21V 21/14* (2013.01); *F21V 21/22* (2013.01); *F21V 23/00* (2013.01); *F21V 23/04* (2013.01); *F21V 29/00* (2013.01); *F21V 33/0052* (2013.01); *G02F 1/1313* (2013.01); *G03B 21/2046* (2013.01); *G03B 23/00* (2013.01); *F21V 21/29* (2013.01); *F21V 21/30* (2013.01); *F21V 23/0442* (2013.01);
(Continued)

(58) Field of Classification Search
CPC .. F21S 8/035; F21S 10/002; F21S 4/28; F21S 10/007; F21S 9/02; F21K 9/65; F21K 9/232; F21V 14/06; F21V 21/08; F21V 5/04; F21V 13/02; F21V 14/003; F21V 21/14; F21V 21/22; F21V 29/00; F21V 23/04; F21V 14/006; F21V 33/0052; F21V 14/08; F21V 17/02; F21V 23/00; F21V 21/30; F21V 21/29; F21V 23/0442; F21V 23/0471; G03B 21/2046; G03B 23/00; G03B 23/105; G03B 21/142; G02F 1/1313; F21W 2131/10; F21W 2121/00; F21Y 2101/00; F21Y 2115/10; Y10S 362/806; Y10S 362/80
USPC ............................................ 324/426; 362/257
See application file for complete search history.

(56) References Cited

U.S. PATENT DOCUMENTS 6,267,478 B1 * 7/2001 Chen ..................... F21S 10/007
353/84
6,333,826 B1 * 12/2001 Charles .................. G02B 13/06
359/725
(Continued)

*Primary Examiner* — M Baye Diao
(74) *Attorney, Agent, or Firm* — Bacon & Thomas, PLLC

(57) ABSTRACT

An AC power source LED light device for projecting moving images includes an LED light or LED bulb arranged to provide moving effects by moving at least one LED, an image forming element, a projection lens, or a projection assembly, or by controlling on/off of multiple LEDs to provide the appearance of movement.

26 Claims, 15 Drawing Sheets

Related U.S. Application Data which is a continuation-in-part of application No. 14/539,267, filed on Nov. 12, 2014, which is a continuation-in-part of application No. 14/275,184, filed on May 12, 2014, now Pat. No. 10,371,330, which is a continuation of application No. 12/914,584, filed on Oct. 28, 2010, now Pat. No. 8,721,160, which is a division of application No. 12/318,470, filed on Dec. 30, 2008, now abandoned, application No. 15/730,291, which is a continuation-in-part of application No. 15/402,965, filed on Jan. 10, 2017, now Pat. No. 10,151,451, which is a continuation-in-part of application No. 14/606,242, filed on Jan. 27, 2015, now Pat. No. 9,541,260, which is a continuation-in-part of application No. 13/367,758, filed on Feb. 7, 2012, now Pat. No. 8,967,831, application No. 15/730,291, which is a continuation-in-part of application No. 15/296,599, filed on Oct. 18, 2016, now Pat. No. 10,228,112, which is a continuation of application No. 14/503,647, filed on Oct. 1, 2014, now Pat. No. 9,719,654, which is a division of application No. 14/451,822, filed on Aug. 5, 2014, now Pat. No. 10,047,922, which is a continuation-in-part of application No. 14/323,318, filed on Jul. 3, 2014, now Pat. No. 10,222,015, which is a continuation-in-part of application No. 14/023,889, filed on Sep. 11, 2013, now Pat. No. 10,323,811, application No. 15/730,291, which is a continuation-in-part of application No. 15/494,477, filed on Apr. 22, 2017, which is a continuation-in-part of application No. 15/355,515, filed on Nov. 18, 2016, which is a continuation-in-part of application No. 14/289,968, filed on May 29, 2014, now Pat. No. 9,551,477, which is a continuation-in-part of application No. 14/280,865, filed on May 19, 2014, now Pat. No. 9,581,299, which is a continuation-in-part of application No. 13/540,729, filed on Jul. 3, 2012, now abandoned, which is a continuation of application No. 13/296,508, filed on Nov. 15, 2011, now Pat. No. 8,562,158, and a continuation-in-part of application No. 13/296,469, filed on Nov. 15, 2011, now Pat. No. 8,711,216.

(51) Int. Cl.

| | | |
|---|---|---|
| *F21V 14/06* | (2006.01) | |
| *F21V 21/22* | (2006.01) | |
| *F21K 9/232* | (2016.01) | |
| *F21V 29/00* | (2015.01) | |
| *F21S 4/28* | (2016.01) | |
| *G02F 1/13* | (2006.01) | |
| *F21S 10/00* | (2006.01) | |
| *F21V 14/00* | (2018.01) | |
| *F21V 17/02* | (2006.01) | |
| *F21V 5/04* | (2006.01) | |
| *G03B 21/20* | (2006.01) | |
| *F21V 23/04* | (2006.01) | |
| *F21V 21/14* | (2006.01) | |
| *F21V 13/02* | (2006.01) | |
| *F21S 9/02* | (2006.01) | |
| *G03B 23/00* | (2006.01) | |
| *F21V 21/08* | (2006.01) | |
| *F21V 33/00* | (2006.01) | |
| *F21V 23/00* | (2015.01) | |
| *G03B 21/14* | (2006.01) | |
| *F21W 121/00* | (2006.01) | |
| *F21V 21/29* | (2006.01) | |
| *F21Y 115/10* | (2016.01) | |
| *F21V 21/30* | (2006.01) | |
| *F21Y 101/00* | (2016.01) | |

(52) U.S. Cl.
CPC ...... *F21V 23/0471* (2013.01); *F21W 2121/00* (2013.01); *F21Y 2101/00* (2013.01); *F21Y 2115/10* (2016.08); *G03B 21/142* (2013.01); *Y10S 362/80* (2013.01); *Y10S 362/806* (2013.01)

(56) References Cited

U.S. PATENT DOCUMENTS

| | | | | |
|---|---|---|---|---|
| 6,558,022 | B2* | 5/2003 | Kawahara | F21S 10/007 362/257 |
| 7,821,717 | B2* | 10/2010 | Woodgate | G02B 3/0031 359/620 |
| 9,267,653 | B2* | 2/2016 | Benner | H01R 33/92 |
| 9,909,739 | B2* | 3/2018 | Chien | F21V 14/08 |
| 10,117,569 | B2* | 11/2018 | Shudo | A61B 3/113 |
| 2013/0242559 | A1* | 9/2013 | Moersheim | F21V 29/70 362/249.02 |
| 2014/0340880 | A1* | 11/2014 | Benner | H01R 33/92 362/147 |

\* cited by examiner

FIG. 1
FIG. 1F
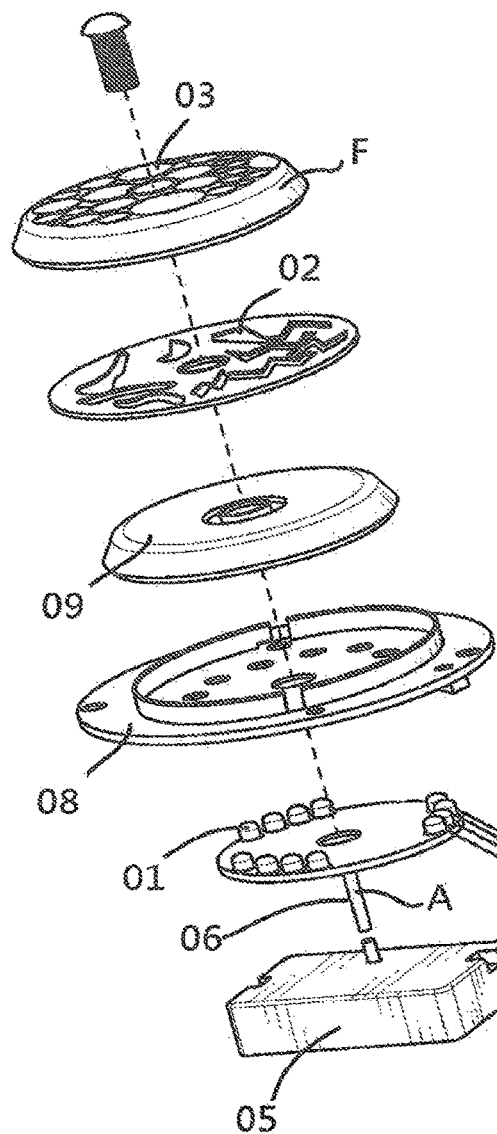
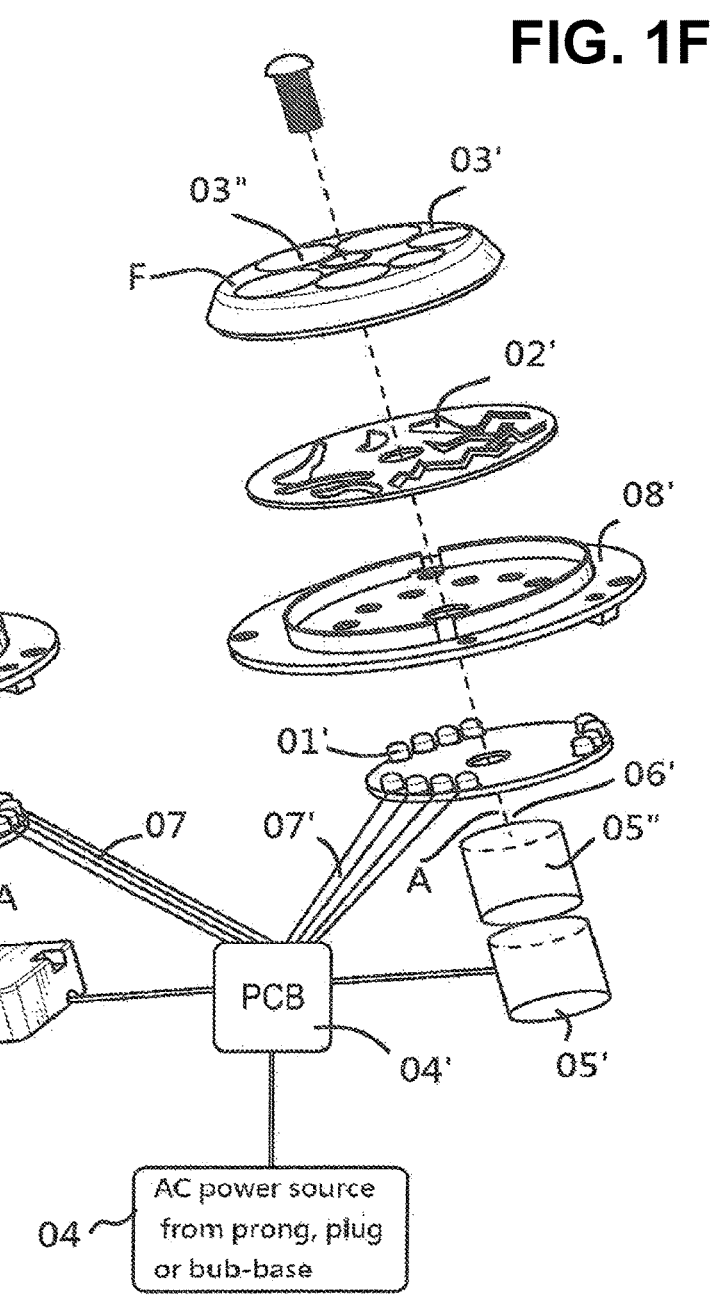

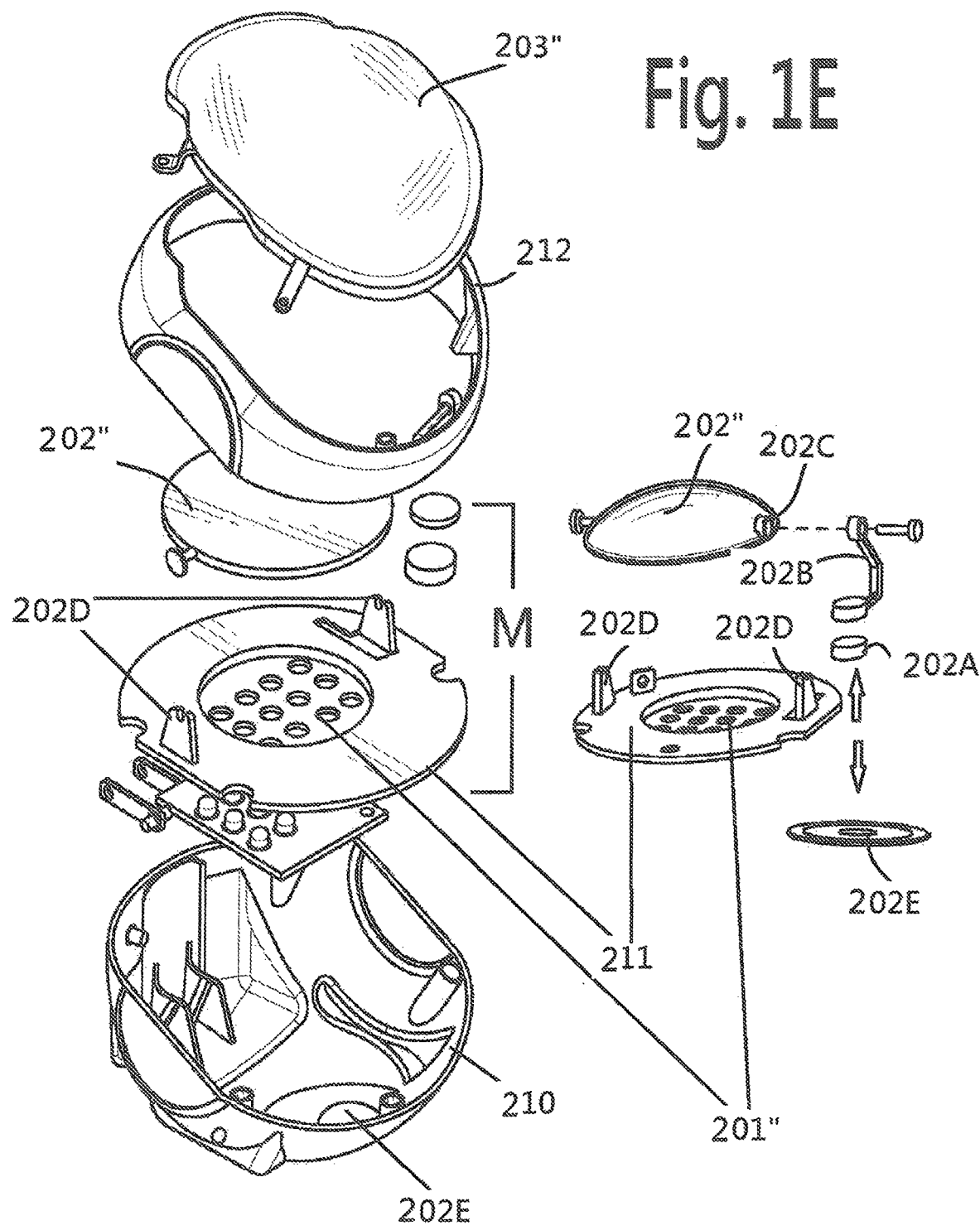

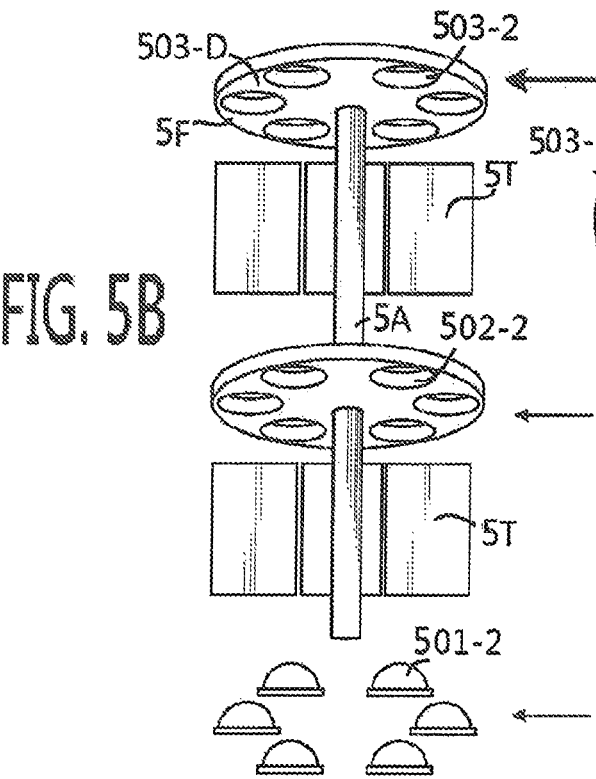
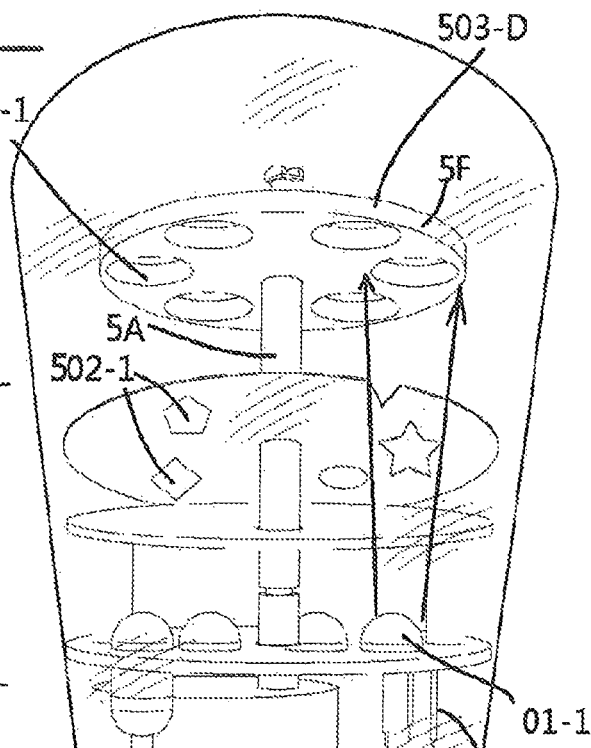
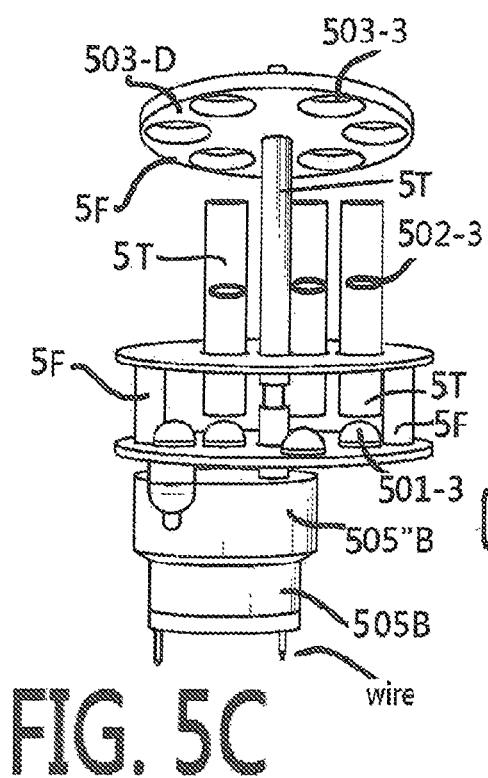
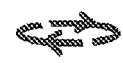

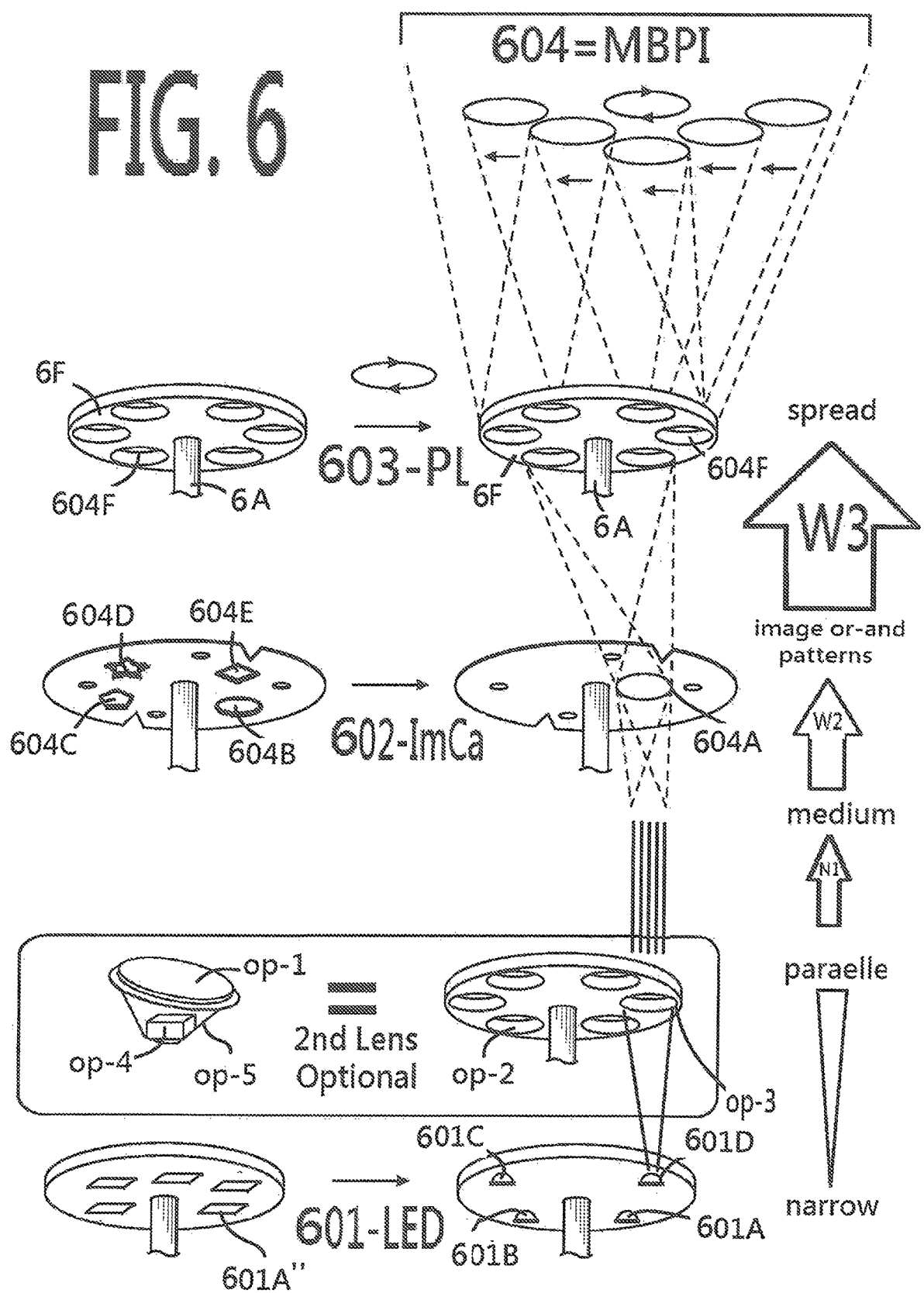

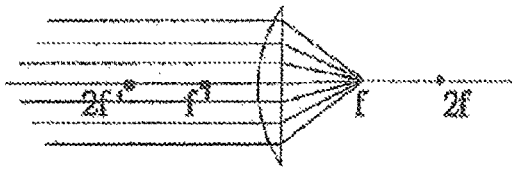

FIG. 7

Base Physic theory for Lens focus

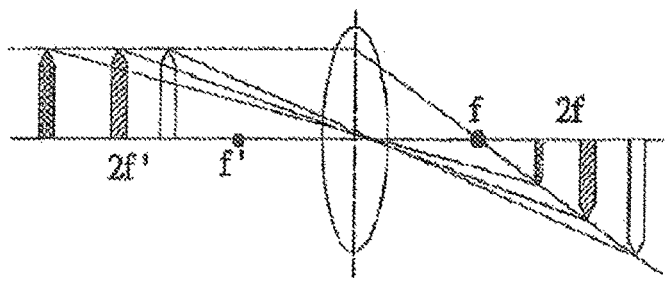

FIG. 8

Basci Physic theory
Relation of object v.s. image v.s. focus of lens.
1. object on 2f' object has same size of image on 2f.
2. object between f' and 2f' -->
   image behind 2f with large reverse image.
3. object away from 2f' -->
   the image will fall within 1f and 2f
   with smaller and reverse image.

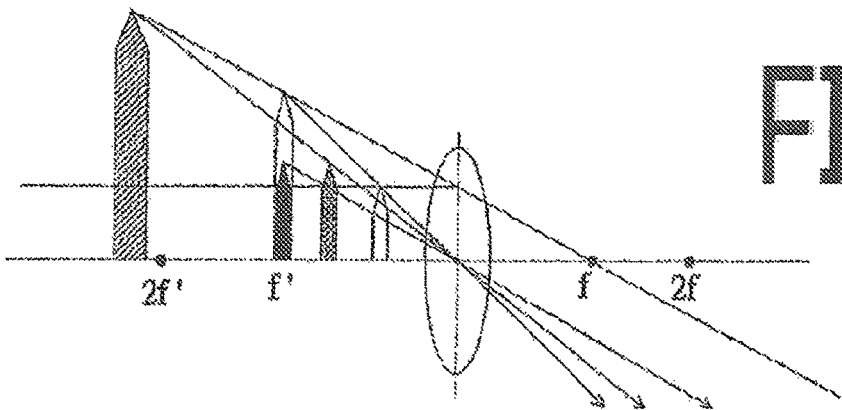

FIG. 9

Object location < f' =>
Image located on the same side of the f'. Image size will become more smaller while the object more close the lens.

FIG. 13 project images (I-90) (I-91) on a Top ceiling (I-90) and opposite wall (I-91) by tilting the optics means to move the image away from the outlet-location's wall and project bigger-size image (I-90) at the top-ceiling.

[0090] FIGS. 10-12 illustrate basic optic lens theory, which is applied to the current invention, to precisely calculate the optics lens, focus, position of the light source, position of all lenses, position of the slides, and/or telescope length to get a desire image that is as perfect as possible.

[0091] Although preferred embodiments of the invention have been described in detail to show the scope of the current invention, it is to be appreciated that any alternative or equivalent functions, or design, construction, modification, and/or up-grade, may still fall within the scope of the invention, which is not limited by the details mentioned in the above discussion. Any alternative or equivalent arrangement, process, installation or the like may still fall within the scope of the current invention, including alternatives to the power source, conductive means, geometric shape of LED-units, joint-means, circuit means, sensor means, switch means, LED elements, attachment means, fixing-means, tightening means, and/or resilient conductive means, which may all have alternative arrangements, design, and construction.

I claim:

1. An LED projection night light, comprising:
   at least one LED arranged to emit visible light beams; and
   at least one power source connected to said at least one LED to cause said at least one LED to exhibit at least one of a desired light function, timing, color, brightness, or illumination effect,
   wherein:
   said LED projection night light is a plug-in light arranged to be connected to a plug-in electrical outlet by prongs, said plug-in night light includes at least one LED to emit light to object has tiny image on it and passing though the image magnify optic-lens to create the Bigger-size image for projecting a desired image, message, data, logo, or time to project onto a top ceiling, opposite walls, floor, or other desired surface, said night light has parts including elements selected from the group consisting of an housing, tube, optical lens, openings, cut-outs, a transparent material piece, a translucent material piece, a convex lens, and a concave lens, and
   The said LED night light has adjustable construction to change the bigger-size image to any desired position, angle, locations, and orientation while people apply force to the said housing or part,
   The said Night light incorporate with straight telescope or tube or housing has LED on one side or end and other side or end has magnify optics-lens and object fit within the said telescope or tube or housing and bigger-size image is shown on remote away surface where is not the surface has outlets for plug-in.

2. An LED projection night light as claimed in claim 1, further comprising said night light includes at least one parts incorporated with the LED for projecting said light through one of a plurality of different object or slides or film to cause a desired image, message, data, logo, or time to project onto a ceiling, walls, floor, or other desired surface
   and means including a movable slide holding member for (A) marble Disc — enabling to change said one of a plurality of slides to a different slide by moving the slide holding member from a first position in which one of a plurality of slides is in front of said LED to a second position in which said different slide is in front of said LED to change said image, message, data, logo, or time.

3. An LED projection night light as claimed in claim 2, (B) motor — wherein said slides are changed by at least one of said roller with manual or automatically by motor, said elastic member, and a push button.

4. An LED projection night light as claimed in claim 2, (C) Rotatable Disc — wherein said slide is mounted in a rotatable slide disc or compartment or holder which containing said plurality of different slides.

5. An LED projection night light as claimed in claim 1, (D) change optic-lens by Rotating unit — further comprising at least one of the following elements: (a) a telescope or tube assembly; (b) tilt means for tilting, (c) rotating means for rotating, (d) adjust means for adjusting, (e) a roller, and (f) an elastic member to change a projection direction or optics lens or object or housing of said night light.

6. An LED projection night light as claimed in claim 1, wherein a projection direction or housing is changed by at least one of said rotating, a tilt, a swivel, a housing, and a bend construction(s).

7. An LED projection night light as claimed in claim 1, wherein said parts includes an extend design and said extend design to changes a relative position of said LED, slides, magnify Optics-lens to adjust a focus of said device 8. An LED projection night light, comprising:
   at least one LED arranged to emit visible light beams; and
   at least one power source connected to said at least one LED to cause said at least one LED to exhibit at least one of a desired light function, timing, color, brightness, or illumination effect,
   The improvement wherein:
   said DC powered night light includes at least one LED to emit light beam to object has tiny image and passing though the image magnify optic-lens to create the Bigger-size image for projecting a desired image, message, data, logo, or time to project onto a top ceiling, opposite walls, floor while LED light put on high locations, or other desired surface, said night light has parts including elements selected from the group consisting of an housing, tube, optical lens, openings, cut-outs, a transparent material piece, a translucent material piece, a convex lens, and a concave lens, and
   said LED projection night light is a DC powered night light arranged to be supplied with power from any combination of an AC adaptor jack, solar power source, wind power source, a generator, battery, an electricity storage device, USB Power source, and a charging circuit,
   means for adjusting said parts, said adjusting means including at least one of a telescope assembly, tilt means for tilting said parts, rotating means for rotating said parts, and extend means for extending said parts, and 9. An LED projection night light as claimed in claim 1, further comprising said night light includes at least one parts incorporated with the LED for projecting said light through at (E) Plurality inside Disc — least one or one of a plurality of different object or slides or film to cause a desired image, message, data, logo, or time to project onto a ceiling, walls, floor while DC powered LED light install on high location, or other desired surface
   and means including a movable slide holding member for (F) moving the holding member (Disc) — enabling to change said one of a plurality of slides to a different slide by moving the slide holding member from a first position in which one of a plurality of slides is in front of said LED to a second position in which said

FIG. 14 different slide is in front of said LED to change said image, message, data, logo, or time.

10. An LED projection night light as claimed in claim 9, wherein said slide is mounted in a rotatable slide disc containing said plurality of different slides.

⟨G⟩ Rotate Disc

11. An LED projection night light as claimed in claim 9, further comprising at least one of the following elements: a roller with manual or automatically by motor or and an elastic member to change a projection direction of said night light.

⟨H⟩ Motor

12. An LED projection night light as claimed in claim 9, wherein said slides are changed by at least one of said roller by manual or automatically by motor, said elastic member, and a push button.

⟨I⟩ Motor

13. An LED projection night light as claimed in claim 8, wherein a projection direction or bigger-image locations is changed by at least one of said rotating, said tilt, a swivel, a housing, and a bend construction.

14. An LED projection night light as claimed in claim 8, wherein said parts includes said extend construction and said extend construction changes a relative position of said slides, said LED, and said magnify optic-lens to adjust a focus of said Night light.

15. An LED projection night light, comprising:
at least one LED arranged to emit visible light beams; and
at least one power source connected to said at least one LED to cause said at least one LED to exhibit at least one of a desired light function, timing, color, brightness, at illumination effect,
wherein:
said LED projection night light is a AC powered or DC powered night light arranged to be connected to a plug-in electrical outlet or get DC power from an AC adaptor jack, or solar power source, or wind power source, or a generator, or battery, or an electricity storage device, or USB Power source, or a charging circuit, The said night light includes at least one LED to emit light to object has tiny image on it and passing though the image magnify optic-lens to create the Bigger-size image for projecting a desired image, message, data, logo, or time to project onto a top ceiling, opposite walls, floor, or other desired surface, said night light has parts including elements selected from the group consisting of an housing, tube or tube assembly, magnify optical lens, housing openings, housing cut-outs, a transparent material housing piece, a translucent material housing piece, a convex lens, and a concave lens, and The said Night light has adjustable construction to change the bigger-size image to any desired position, angle, locations, and orientation while people apply force to the said housing or parts of the said night light.

The said Night light incorporate with straight telescope or tube has LED on one side or end and other side or end has magnify optics-lens or assembly and object fit within the said telescope or tube or housing and bigger-size image is shown on remote away surface where is perpendicular or vertical with LED light beam.[IC]

The said Night light the LED light beam vertical or perpendicular traveling though Object, slide, film, magnify function optics-lens to form the bigger-image.

The said night light has more than one object(s), slide(s), film(s) arranged on disc, holder, compartment device which can be changeable, replaceable.

* * * * *

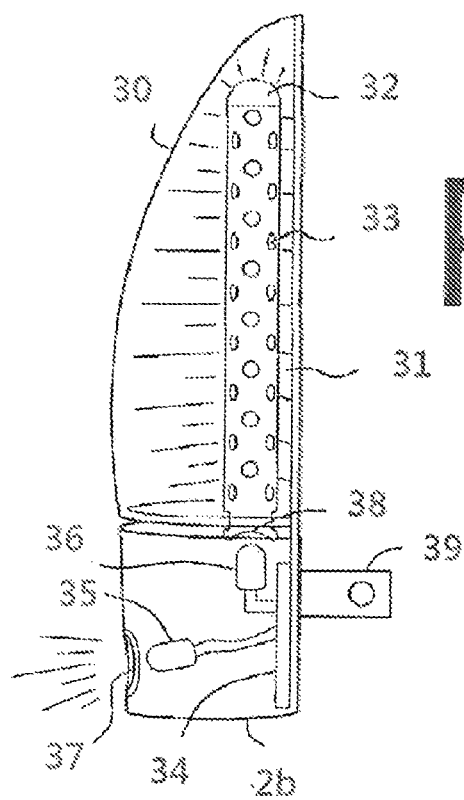

AC POWER SOURCE LED LIGHT HAS MOVING IMAGE OR-AND PATTERNS PROJECTION

BACKGROUND OF THE INVENTION

The present invention utilizes elements disclosed in the following U.S. patent applications of the inventor:

(#FF-1) U.S. application Ser. No. 12/886,832 filed on Sep. 21, 2010 now is U.S. Pat. No. 8,721,160 which is CIP for filing of (#FF-2008) U.S. application Ser. No. 12/318,470 filed on Dec. 30, 2008 now abandoned, which is Division for filing of which is Division for filing of (#Q-2007) U.S. application Ser. No. 11/806,284 Filed on Dec. 15, 2007 now is U.S. Pat. No. 7,630,004 (#ZZZ-4) U.S. application Ser. No. 14/296,599 Filed on Oct. 18, 2016 which is Continue In Part filing of (# ZZZ-3) U.S. application Ser. No. 14/503,647 filed on Sep. 11, 2013 now is U.S. Pat. No. 9,719,654 which is Division filing of (# ZZZ-2) U.S. application Ser. No. 14/451,822 filed on Aug. 5, 2014, which is Continue In Part filing of (# ZZZ-1) U.S. application Ser. No. 14/323,318 filed on Jul. 3, 2014 which is Continue In Part filing of (# ZZZ-13) U.S. application Ser. No. 14/023,889 filed on Sep. 11, 2013.

Each of these application is related to the wider area image or project image night light or LED bulb or AC plug wire LED outdoor light with or without motor/spin/rotating kits for moving image.

(# QQQ-7) U.S. application Ser. No. 15/494,477 filed on Apr. 24, 2017 which is continue in part of (# QQQ-6) U.S. application Ser. No. 15/355,515 filed on Nov. 18, 2016 which is continue in part of (# QQQ-5) U.S. application Ser. No. 15/341,782 filed on Nov. 2, 2016 which is continue in part of (# QQQ-4) U.S. application Ser. No. 15/348,218 filed on Nov. 10, 2016 which is continue in part of (# QQQ-3) U.S. application Ser. No. 14/983,993 filed on Dec. 30, 2015 Now is allowanced which is continue in part of (# QQQ-2) U.S. application Ser. No. 14/289,968 filed on May 29, 2014 Now is U.S. Pat. No. 9,551,477 which is continue in part of (# QQQ-1) U.S. application Ser. No. 14/280,865 filed on May 19, 2014 Now is U.S. Pat. No. 9,581,299 which is continue in part of (# QQQ-2012) U.S. application Ser. No. 13/540,728 filed on Jul. 3, 2012 now is U.S. Pat. No. 8,834,009 which is Division filed of (# JJJ-1) U.S. application Ser. No. 13/296,469 Filed on Nov. 15, 2011 now is U.S. Pat. No. 8,711,216 (# MMM-2) U.S. application Ser. No. 15/402,965 Filed on Jan. 10, 2017 Which is continue in Part of (# MMM-1) U.S. application Ser. No. 14/606,242 filed on Jan. 27, 2015 now is U.S. Pat. No. 9,541,260 which is Continue in Part of (# MMM-12) U.S. application Ser. No. 13/367,758 filed on Feb. 7, 2012 now is U.S. Pat. No. 8,967,831.

Related for the LED Bulb has more than one area has illumination including head, body: (# JJJ-1) U.S. application Ser. No. 14/049,427 Filed May 22, 2014, now is U.S. Pat. No. 9,010,986 Apr. 21, 2015 issued, which is continue filing of (# JJJ-11) U.S. application Ser. No. 13/296,508 Filed on Nov. 15, 2011. Now is U.S. Pat. No. 8,562,158 issued on Oct. 22, 2013.

Related the LED bulb has built-in Camera and storage-kits with multiple functions to replay, see by wired or wireless. (# AAA-1) U.S. application Ser. No. which is Continue in Part of (# AAA) U.S. application Ser. No. 12/984,583, Filed on Now is U.S. Pat. No. 9,157,589 which is Continue in Part of (#TT-2) U.S. application Ser. No. 14/968,250, Filed on Dec. 14, 2015 which is Continue in Part of (# TT-1) U.S. application Ser. No. 14/944,953 Filed on Nov. 18, 2015 which is Continue in Part of (# TT-12) U.S. application Ser. No. 12/866,832, Filed on Sep. 21, 2010 This is Division filing for (# FF-4) U.S. application Ser. No. 14/968,862, Filed on Dec. 14, 2015 which is Continue in Part of (# FF-3) U.S. application Ser. No. 14/539,267 Filed on Nov. 12, 2014 which is Continue in Part of (# FF-2) U.S. application Ser. No. 14/275,184 Filed on May 12, 2014 which is Continue in Part of (# FF-1) U.S. application Ser. No. 12/914,584 Filed on Oct. 28, 2010 now is U.S. Pat. No. 8,721,160, This is Division filing for (# DD-5) U.S. application Ser. No. 14/968,153 Filed on Dec. 4, 2016 for LED light has projection features which is continue in part of (#DD-3) U.S. Pat. No. 9,097,413

In addition, the following U.S. patents show light devices having some features that are similar to and some that are different from the current invention:

1. U.S. Pat. No. 8,128,259 Myers et al.

disclosure a spherical ornamental fixtures which is not (1) A LED bulb (2) No optics lens to get refraction light design (3) No rotating or moving device such as motor or movement (4) No any image forming arrangement such as texture on lens or film or slide.

'259 maximum can be a ceiling light or desktop light which has light source (59) or (159) arrange on the post and emit light to the ornament piece which need glow the whole sphere which should be more close the co-inventor's earlier issued U.S. Pat. No. 5,667,736 has laser treated lens to spread the inner light source to wider range which filed on Feb. 7, 1995 and Sep. 16, 1997 issues.

So, this is nothing to do with current invention for above listed (4) major difference for (a) Application (b) physics theory (c) Construction (d) design.

2. U.S. Pat. No. 7,748,869 Sevack et al. disclosure (1) a clip-on project assembly for recessed lighting fixture on it trim area. (2) The light source use the existing recessed light for (3) super high heat light source 50Wa MR16 or GU 10 halogen bulb so (4) need use the thin metal template disk with cutout patterns or etched glass so can (5) project the patterns on surface on floor, wall from ceiling recessed lighting fixture. (column 1)

'869 major difference with current invention including (a) Not a Bulb with bulb bas to fit into bulb receiving socket (b) Not has self-contained LED light source (3) No use the cool light source so no need use heavy metal or glass (4) Not possible use film/slide/plastic printed piece as image forming kits because use the High wattage and high power consumption existing halogen bulb. So all major application, physical theory, attachment, installation, construction. None of any one is similar with current invention.

3. U.S. Pat. No. 6,558,022 Karahara disclosure the different device with current invention including (1) From FIG. 1, 2, 3, 4, 5, 6 can see the Light source (16) is a Radiant light 17 (which is not the LED light source because LED light has no this riant light 117 to emit light to 360 degree)

Also, from Column 4 line 54 to 63) all the light source all belong to the Radiant light source. So the light source need for 360 degree radiant type not same as current invention for LED light.

(2) The '022 patent teach a pin-hole image to form the image from a radiant light source (Bulb) which is not same as the current invention has to use convex lens to get lighted image passing through and enlarge image. The '022 use pin-hold image to create the enlarge size of the image by distance between the light source/shade/image location so can get desired image. So the physics theory for (Pin-Hole image) v.s. (convex lens image forming image) theory is totally different.

(3) '022 use the convergent lens which is not same as convex lengs. Convex lens is enlar and make the light beam spread out not convergent purpose.

(4) '022 use the radiant light source as column 4 line 53 to 63 which has high heat so the shape with opening or design have to far away with the light source or will be burn which is not like the current invention the image forming piece is made of plastic or slide or film or texture lens which all made by plastic and very close to light source because current invention use cool light source LED.

(5) The '022 is not a LED bulb, '022 is a lighting fixture which can not insert into bulb receiving socket at all. So Pen and Rocket totally nothing to do with '022 patent for current invention.

4. U.S. Pat. No. 6,267,478, The Chen disclosure the changeable image construction for single image project to the locations which is different with current invention as (A) As FIG. 1 shown the display unit (40) is position front the opening (20) rotating-disc which is front of the single opening base-plate (10) so the image present to location is only SINGLE image not like the current invention for (Multiple images shown on the locations at same time). (B) The light source is Light Bulb (50) at the 2001 there is no any LED for white light can get at market place and has sufficient light source and lighted any image. (c) '478 the theory is as column 4 Line 1 to Line 18 stating the light source (50) on reflector (531) because bulb radiant light source so need reflector (531) to collect all light beam to front and the light beam go though the light transmitting hole (12) of base-plate and again go through hole of rotating-disc (20) and hit the image carrier-disc (40) and go out from the single Front Lens.

(531) □ This is different than current invention for light from LED light source go to preferred and optional optical lens to adjustable LED light beam and go through the image forming means (may rotating or steady) and go through the magnify lens sets (rotating or steady) and go to outer Dome or sphere optics-lens to get as wider as possible illumination areas. □So (AA) the current invention the position for the Image forming means is directly top of the LED (Light source) because no heat issue like the '478 high heat bulb will melt the plastic slide/film/printed plastic piece. (BB) The Current invention no need reflector (531) to collect all the radiant light beam like bulb (CC) The current invention only moving the Optics-lens disc not the image forming means and this moving optics-lens will create the image is MOVING, Not chaning functions so this is image performance and effects and theory different (DD) The '478 use a Spring pressure box (35) and a lot of cam 33, pad 352, screw 231, nut 44 flap 31 teeth 24 pressure spring 351 for locking or freeze or release for mechanical design is not needed for current invention.

So the current invention just use a gear-box which can get desired rotating speed which is much simple than the '478 construction and lower cost so not compatable at all. (EE) '478 is not for a LED bulb that is mechanical construction which is totally different with current invention construction for rotating part, image function, light performance . . . etc.

So this is major different with current invention for different image performance and different rotating object and different construction for motor and disc assembly and position so not same as current invention at all.

5. U.S. Pat. No. 3,762,082 Mincy disclosure the varicolored disk install on a fenestrated disk and juxtaposed varicolored to make the below light beam to reflected out to see hrobbing or twikling pulses of color . . . □The difference at (A) light source (34) is high power bulb which is so hot so can not have any image forming plastic piece on top because heat is always flow to top as current invention to use slide/film/printed plastic piece (B) the illumination member (14) which '082 as column 2 line 9 to 20 said how to make the distorted regions 36 and created the interface 38 of the top Cylinder shape. So this is not same as current image forming piece is flat plastic piece such as slide/film/printed plastic piece. (CC) The '082 has no moving device (DD) The '082 is not for a LED bulb (EE) The '082 has no optics theory for enlarge lighted image, So '082 is totally different with current invention.

6. U.S. Pat. No. 8,262,252 Bergman disclosure the image design change from 1 image to N-number of image depend on how many image and optics lens been arranged. This is not same as the current invention to make the each image to travel a arc or partial of circle at the same time which is not become 1□ n-number□ 1 . . . . Light performance because major different is the current invention (A) not rotating the image and optics-lens together at the same time. The current invention only make the said Plurality of optics-lens rotating on desired speed so need gear box which '252 do not need this gear-box. (B) '252 need to very precisely to design for distance and focus for the image to project on fixed distance so this will be a custom-made product which is not same as current invention the image can fit for any kind of ceiling or wall distance the image can be readable and acceptable because never had image effects to combine N-number of image into one clear image and/or separated 1 consolidated image to separate into N-Number of separate clear image. So the requirement for precisely calculation for the distance or gap of the LED or image carrier or the image location distance needed (C) '252 other big issues is the optics lens is too complicated in order to get the FIG. 1A, FIG. 2-A, FIG. 2-B light path because to get the light beam travel for a straight direction without enlarge so can not use the current invention simple convex lens which will enlarge or/and diversify the image which never like the '252 FIG. 1A, FIG. 2-A, FIG. 2-B for precisely complicated lens assembly to get the result for parallel image present to image location just keep same radio same size as LED and image spacing or gap. So '252 is get image same size as the Image forming. Not enlarge to N time bigger for these parallel light beam after complicated lens assembly.

More important□ 252 is a illumination system. Not same as current invention (AA) is a LED bulb (BB) The image is moving effects for arc or partial circle moving (CC) The current invention has multiple image spread only not consolidate into 1 image □□ or/and separated into Nimage both is clear (DD) the current invention has magnify and enlarge the image. Not like '252 still parallel and keep same size shown on the image locations (EE) The current invention use simple convex lens not same as '252 have to keep same space and distance as LEDs and Image space from lower device. So '252 is nothing to do with the current invention. US Prior Art U.S. Pat. No. 6,588,002 as below.

1. The '002 is typical for Physics is (Pin-Hole image) system which the
   1. Light traveling theory and direction--→Passing through the holes→Light beam go direction to the screen→To show the shape.
      The '002 light emit direction is straight which has no any reflective (emit into and emit back v.s. the angle of emit-into angle) or refractive (The light beam passing through the optics-lens to emit into the lens material and make deviation and emit out from optics-lens other surface). So the light traveling path is totally different as '002 all drawing show is simple straight light traveling.
2. Light source different:
'002 show the Light source is radiation spread out from light source which means that is bulb light source So can have more than 120 degree light beam emit out from single light source.
The current invention is LED light source which have to use DC current to drive so while apply for the outdoor light for big power have to connect with AC plug wire with Outside or built-in AC-to-DC circuit or get DC Big current power from outside AC-to-DC transformer to supply enough current to outdoor light device or high power consumption LEDs for other location application.
3. The Physics theory and light traveling theory is totally different:
'002 Pin-Hole image with Radiation Bulb light source as all text of '002 and Figures.
The current invention is not same as '002, The current invention is (Lens imaging) as the attached theory for (Object→Located on certain distance to the Lens focus points to form the size changed image which has smaller or equal or enlarge basing on the object located outside the $2^{nd}$ focus point or within the $1^{st}$ or $2^{nd}$ focus location or within the $1^{st}$ focus location.==>More simple physics word is (refraction). This is not only can created (colorful) (detail) (Sharp pixel image).
Also, the current invention also incorporated with the (Reflective properties) which is the Light beam emit to the lens with certain emit angle to lens and will reflected to certain angles out of the lens.
That is not same as '002 Pin-hold image light beam travel straight through the opening or holes or light passing able material.
4. The '002 is a radiation light source which is a bulb so the (Display unit) have to far away to the super high
Temperatures light source as all '002 drawing show. It is not same as the current invention which has is LED which is cold light source which will not make the some display-unit like film or slide or paper or plastic sheet or laser film to melt or even fired.
So The '002 is not any relation for current invention for
a. Light source.
b. Light passing direction.
c. Physic theory and definition
d. Heat issues
e. Circuit need for AC-to-DC with Big current for big power consumption for Plurality LEDs or Big power LED
f. Distance between light source v.s display unit need far away for super high temperature or burn out.
8. (#FF-4) U.S. application Ser. No. 14/968,862, Filed on Dec. 14, 2015
Which is Continue in Part of
(# FF-3) U.S. application Ser. No. 14/539,267 Filed on Nov. 12, 2014
which is Continue in Part of
(# FF-2) U.S. application Ser. No. 14/275,184 Filed on May 12, 2014
which is Continue in Part of
(# FF-1) U.S. application Ser. No. 12/914,584 Filed on Oct. 28, 2010
now is U.S. Pat. No. 8,721,160, This is Division filing for
(#Q-2007) U.S. Pat. No. 7,632,004 or U.S. application Ser. No. 11/806,284 is CIP of the LED light has more than one of optics-means.

The above listed parent filed case basing on (#FF-series) has very details for
(a) "movable disc to load plurality of image-carrier or film or slide or image-forming units" as attached Drawing Page _ of (#FF-4) and its claim; and
(b) the LED light has other parts which including the "Rotate device to make rotating the optic-lens" as attached drawing page of (#FF-4) and its claims _; and
(c) The LED light has "rotating the optic-lens by motor" inside the page _ of (#FF-4) and its claims _ Point _.

From (# FF-Series) is PARENT filing for the (a) Moving Disc to install plurality of image-forming units (b) Rotating Optics-lens by Motor (c) Rotating optic-lens by motor; so the (#FF-Series) is Parent filing case of current invention and (#FF-Series) is Division Filing case of (#Q-2007) U.S. application Ser. No. 11/806,284 filed on Dec. 15, 2007 which "LED light has more than one optics-mens" is just same as current invention has plurality of Optic-lens fit within the movable disc as (#FF-Series) drawing FIG. 1, FIG. 1B, FIG. 2, FIG. 3. It is appreciated the Pending (#FF-4) (#FF-3) (# FF-2) and Its parent (# Q-2007) all concept, claims, idea should fall within the current invention claims and scope without any argument for these PARENT and PENDING cases before the current filing case filing date.

The current invention has make big improvement than all these 8 prior arts and make it simple manufacture, low cost, less assembly process, make different light functions.

From all the co-pending filed parent cases has function or features as below which NOT ONLY for parent filing features including (1) Project light (2) More than one function (3) adjust focus (4) adjust angle (5) Elastic contact points (6) LED heat solution (7) Heat sensitive parts installation (8) extend means BUT ALSO including new features (a) has movable-means to allow the at least one of level of the more than one lever LED bulb can move the desire level(s) away from original position, location, orientation to overcome all the interfere block-means so the said LED bulb can solve the (a) heat issue from LED(s) or circuit or electric components (b) lamp shade metal frame's block out the LED bulb light beam traveling (c) glass or metal or cement block means to block out the electric signals transmit from Bluetooth means, wifi means, internet means, App software means or any other electric wave-signals transmitting to control the said LED bulb and its related electric parts or accessories. It is appreciated all the above listed or discussed co-pending or issued patents co-inventor's concept, idea, design still should be consider within the current inventon's scope and fall within the current invention's claims.

Furthermore, the current invention has the moving Big project-image light performance to be seen on wider viewing angle which can created by (aa) making the said LEDs has different time to turn on and off to make light source changing portion related to the film/openings/project lens, or-and (ab) making rotating, spin, vibration, shake, moving of the said film/openings/slide/printed piece, or-and project-lens has refractive or-and refractive or-and diffusing or-and other desired optics properties, so can make the big projection image has desired moving effects. The current invention with moving or steady big projection image still fall within the basic relative position for parts those are still same as all co-pending filed parent cases, such as LED light source emit light to Film/openings/slide/printed piece/texture lens/ treated lens/printed piece/variable thickness lens or other market available piece can create the image or-and lighted patterns (image-carrier) to project-lens which has at least refraction properties and all these LED/Image carrier/project lens 3 major components is the most simple and lowest cost project-assembly can fit into or install or arrange or assembled with LED light housing, or tube, or tube assembly, or frame, or holder, or disc, or groove, or ditch; those can be the separated piece(s) or can be the said housing or parts including but not limited for LED light or LED bulb only it should cover at least the said outdoor project light or outdoor seasonal project light or outdoor holiday season project light.

All these features of current invention just same as the concept of these parent co-pending cases for LED night light of the co-inventor's co-pending filing to apply to the same theory and same concept with same major kits including but not limited for 3 major components and its high low position relation LED+ image carrier+ Project lens into the said market available all kind of products just need a different construction of housing and arrange the 3 major components for each products for example but not limited for these preferred examples:

(I) Bulb housing with Bulb base with the one more twist-tight bulb base electric contactor will become the current inventions LED project Bulb with variety construction including has overcome block-means as co-pending (#QQQ-2) Ser. No. 14/289,968, (II) Outdoor project light which only need to design a housing and arrange the at least 3 major components into and has proper AC-to-DC circuit from outside transformer or built-in side the housing with preferable or optional other parts & accessories with motor system to rotate the said disc which has install plurality of optics-lens so can make the at least one or more than one LED light beams passing through the top image carrier $1^{st}$ and then go through the top geometric or dome or half ball or at least half ball or flat cover or-and project-lens to have 1 time or more than one times LED light beam passing through the image-forming-unit(s) which may (1) LED light beam go $1^{st}$ through texture lens and go through $2^{nd}$ variable project lens or (2) LED light beam go $1^{st}$ through a slide or film and go through $2^{nd}$ refractive properties project lens to enlarge the arts or image, or-and (3) LED light beam go $1^{st}$ image-forming-unit(s) and go through the $2^{nd}$ refractive project lens and $3^{rd}$ go through a protective or environment light passing through lens or cover;

All these 3 examples is just for some simple arrangement which may (i) have different number or color of LED(s), or (ii) have different number, or type, or desired treatments of surface or material, or different image, marking, printing, text, arts, holes, cutout, polished, opaque, contour, shape of the said image-carrier, or (iii) have different arrangement, number, optic-properties, clearance, focus, adjustment kits, variable thickness, refractive or-and reflective or-and diffusing or-and random reflective or-and opening or-and windows or-and steady or moving of the said optic-lens, or (iv) have optional other optic-lens to make narrow LED light beam to become wider and parallel light into image forming-unit(s) or protect cover or heat-sink device or frame, holder, rotatable disc, compartment, conductive wires, sensor, ground pole, ground sticker, ground installation kits, environment cover or device or shell or ball to add for the said all kind of construction of light device.

From the co-pending all projection theory discussed or listed above, the current invention further disclosure the one project LED light or LED bulb has built-in multiple project-assembly like the co-inventor's U.S. Pat. No. 8,083,377 issued date Dec. 27, 2011 FIG. 15 and FIG. 16 has the multiple project head to create multiple big project images on areas or surface. The current invention also had same concept to have multiple LEDs and image carries and project-lens with the motor/time piece movement/rotate kit/spin kit/movement/magnetic & magnetic-coil set/IC with parts to make the light source or-and image carriers or-and project-lens to make moving effects to viewers.

The current said LED light is cover all the plug-into Outlet night light or desktop night light which has the housing parts, tube, tube assembly like U.S. Pat. No. 8,083,377 FIG. 4 to install the said image-carriers or-and project-lens or other parts including but not limited such as other optics lens, motor, gear set, time piece movement with desired speed for spin, or-and holder, frame, disc to hold the said disc of plurality of optics-lens, project lens, tube piece, LEDs, image carrier or carriers with desired focus with adjustable kits to variable requirement for different distance for big Image surface.

The current invention of LED bulb same as above discussed LED outdoor project light or LED night light has any number of the housing parts or multiple tube or tube-assembly or-and LEDs or-and project-lens assembly to put all parts inside the existing marketing similar bulb shape housing. The said major 3 parts LEDs, image carrier, project lens fit within or install into the said tube, tube assembly, housing parts of LED bulb or LED outdoor project light. As long as the arrangement same as LED—Image carrier—Project Lens all should be fall within the current invention with moving device including the (1) LED has desired on-off time and period time and functions (2) Motor/movement/spin/rotate device to move the image carrier or-and project-lens or LED(s). The LED bulb can use for all desk lamp or down light or recess light lamp holder or some adaptor with preferred or optional power switch or auto sensor switch and all co-pending parent filing features including:

The current invention co-pending (# QQQ-2) U.S. application Ser. No. 14/289,968 teach LED bulb also good for LED Bulb for upper or down installation because has including extractable design, extendable design which can overcome the down light application because some down light (LED Bulb base face sky) has lamp shade which made of glass, metal, cement, concrete surrounding the said Down light or recess light installation so these electric-signal block-means will affect, interfere the electric signal transmitting so let Bluetooth control, Wifi control, remote control, infra-red control, internet control, App software control loose or reduce or limited the signal transmitting to let these functions become a problem. So the current invention's co-pending (# QQQ-2) U.S. application Ser. No. 14/289,968 teach all proper movable-means help to overcome these electric signal block means and make the LED bulb has its designed and pre-determined functions without any affect or interfere or limited by the said electric-signal block-means.

The current invention's co-pending (# QQQ-2) U.S. application Ser. No. 14/289,968 teach has more than one level(s) (including parts and accessories) LED bulb which each level can has its own functions or multiple functions control by market available skill or method may selected from Blue-tooth, Wifi, internet, App software, IC, Remote signal, infra-red signal, motion sensor, heat sensor though computer, communication, consumer device by people. Such as the more than one levels LED Bulb has (1) Multiple colors with changeable colors and moving effects (2) Multiple functions select from market available any LED light effects for indoor and outdoor lighting (3) Multiple control means which select from market available control, sensor, switch, blue-tooth, wifi, internet, app software, remote, infra-red or other electric or electronic related circuit or device(s) (4) More than one movable-means (5) Changeable geometric shape (6) Changeable construction (7) moveable means select from any group combination from bar, pole, spin, rotate, hinge, arms, joints, join, frame, connector, sections to make the levels, parts, accessories to be move away to desire location, positions. These are the main features of the current invention.

The current invention mainly for LED bulb which has following co-pending US application many cases also teach other features as parent filing case stated as below:

1. The current invention co-pending U.S. application many cases also teach the said LED Bulb has other features that the LED bulb can have more twist degree or twist angle after LED Bulb's contact-Point touched electrode—This features can get horizon more than 360 degree to let the light beam to position the certain area(s) to get more wider of adjust angle and more wider of adjust directions and it also can incorporated with adjustable Focus means to make the same of LED light beams or image to shown different light performance on the desired locations or area(s). The Rotatable LED Ball with two arms to offer the said LED Bulb of preferable Geometric shape and construction, can adjust angle in vertical axis up to more than 360 degree angle so can get the LED Bulb's plurality of light beams can cover all x-y-z axis areas by at least one of light beam or plurality of the light beam to illuminate the near-by or far-away or remote-away or any combination of the said LED Bulb.

2. The current invention co-pending U.S. application many cases also teach the said LED Bulb has (i) One or more than one of the light beams arrange in LED bulb for desire light performance. As co-pending filing content which has (ii) more than one LED light source(s) are for Night light, and has (iii) more than on project assembly for project LED lighting. The current invention can create same light performance as the co-pending or patented applications as attached drawings, the difference than prior-arts with night light because Night light has prong means and for outlets installation and not have extend/retractable design. However, for the LED light has (iv) more than one of optis-lens which is disclosure inside the (#Q-07) which is parent case of co-pending filed case of (#FF-4) (#FF-3) (#FF-2) which has also details description for disc to install plurality of image-carrier(s) and rotating by motor so the current invention is Child filing case for (#FF-4) and (# Q-07—more than one optic-lens) and just change (AA) Disc to load the Plurality of "optics-lens" instead of "image-carrier", and (BB) just change to "LED outdoor lighting" housing instead of "LED night light" housing. So simple keep the same (disc install plurality of image carrier or optic-lens) and keep the same (rotating device rotate the optics-lens) and keep the same parent (#Q-7) "LED light has more than one optic-lens". These features and concept is same as parent co-pending (# FF-4) (#FF-3) (#FF-2) which is Division filed of (# Q-07) as above disclosure and drawing attachments for (#FF-4) public data and claims for these wording and also disclosure the (#Q-07) issue patents 4 pages for verify the continuously filing and division filing so there should not any LED related light application should be copy the current filing case and its parent co-pending case or issued parent filed case.

Furthermore, the current invention is CIP of the parent of the (#FF-4) which is the CIP of U.S. application of (#11-2009) Ser. No. 12/624,621 filed on Nov. 24, 2009 which is CIP of the US (#Q-07) which discussed on above listed parent case. The (#11-2009) had very clear and solid claim for the same 3 major components LED, and image-carrier or display-unit, and project-lens or-and protective lens or cover of the said project assembly is fit into or install into the outdoor garden light, outdoor seasonal light, outdoor Halloween light, outdoor Christmas light to project, fixed or steady or changeable image or lighted patterns. From the U.S. application Ser. No. 12/624,621 parent filing case claim 1 can see all these claim. It is appreciated that the current invention parent (#FF-4) its parent filing case (#Q-07) also is the parent of the (# II-2009) and (#II-II) U.S. application Ser. No. 13/534,611 both had (aa) The 3 major components arranged inside the MAIN PRODUCTS to project the Fixed or Steady or movable or changeable image or lighted patterns (bb) The said main products is one of Outdoor garden light, outdoor seasonal light, Outdoor lighting which is same as the current invention concept, idea and this current invention just put all CO-PENDING PARENT FILED case for (# Q-07) (#II-2009) (#II-2) (#FF) (# TT) (# ZZ) (#QQQ) series and make brief for apply the project-assembly 3 major components can get the most simple construction and lowest cost to make clear image or-and lighted patterns with optional to change position of LED, or-and image-carrier, or-and optic-lens by motor or manual device. It also can have optional focus or projected-image location adjustment. It also can have digital data projection.

3. The current invention co-pending U.S. application many cases also teach the said LED Bulb has Focus adjustable-kits so can make same light beam emit out from same LED bulb to wherever surface(s) with desired light performance with brightness, size, light spots, color, lit-areas. The same light beam output from same LED Bulb with focus adjustable kits can create the different light pattern, light path, light brightness, light performance, light direction, light performance by viewer.

4. The current invention co-pending U.S. application many cases also teach the said LED Bulb has extendable parts such as extend tube, telescope tube or equivalent extendable, receivable piece which can install the electric parts & accessories etc. The extendable or the like parts of LED bulb can keep away from LED(s)'s heat, block-objects of lighting's curtain, lighting's shade, lighting's glass, cylinder tube of recess lighting, or other block-objects which block the motion-sensor lens, remote control signal, or light beam emit direction. The extendable or retractable parts keep the said LED bulb's related Circuit board/control/IC/switch/sensor/electric parts or assembly or accessories away from the LED-units or block-objects to prevent from heat affect the desire functions, performance, such as Motion sensor or PIR sensor head or Fresnel lens or LED-unit light beam emit direction.

5. The current invention co-pending U.S. application many cases also teach the said LED Bulb has Extractable/extendable/movable kits to put heat sensitive or light sensitive parts away from LEDs' heat, light's shade, light's curtain, light's glass, decorative material, ceiling block objects, or any other block objects which will interfere the LED bulb or LED Bulb's related parts & accessories. The said extendable or extractable parts preferred to design on front of the LED bulb, but it depend on the different requirement and different consideration of heat, block-object location. The extendable or retractable parts offer the more space to install the preferred electric parts & accessories, offer the extra length to far-away from heat means or block-objects so the LED bulb can overcome heat and block-objects for any applications, installation.

6. The current invention co-pending U.S. application many cases also teach the said LED bulb different from all market available LED Bulb which offer The illumination only cover the adjacent area which are start from the LED Bulb to certain distance (illumination surrounding LED Bulb or start from LED bulb to certain distance with illumination) and do not offer the illumination or image to a area(s) which has certain direction(s), angle(s), distance(s) which far away or remote-away from the LED Bulb. The current invention can make any combination to offer the near-by areas illumination, far-away areas illumination or together for both illumination effects.

7. The current invention co-pending U.S. application many cases also teach the said LED Bulb has more than one light beams output to different area(s), direction(s), location(s) and make more than one areas or locations has illuminations which all these areas may not adjacent, link, sit together. The said LED bulb may offer more than one area(s) have illumination is other features of current other features which can allow people to make the energy saving and only offer illumination for where needed such as Stair lighting which only Up or Down two direction need illumination to see stairs. Rest areas no need the light at all and the said stair-lighting has built-in motion sensor has sensitivity up to 10-30 feet is enough to cover one floor stairs (Normally is 18 steps). One light beam for LED bulb to emit up 9 steps and one light beam of same LED bulb to emit down 9 steps. This will be enough illumination because each UP or DOWN stair are been illuminated by each Floor's one LED Bulb, so 2 different of light beam(s) to offer same one UP or One Down 9 steps . . . . This is pretty good power saving device while motion sensor device build-in more than one of light beam as output from one LED bulb.

Hence, the current invention & co-pending U.S. application many cases also teach LED light or LED Bulb can has at least one or plurality of light beam output from one LED bulb or LED light to near-by area(s), remote-away area(s), far-away area(s) or any combination of these area(s) with adjust angle, adjust focus, elastic contact-point, rotate/spin/tilt frame or support or base to get desire direction to emit light beam or-and project image or-lighted patterns for fixed or steady or moving or changeable performance, or has added extend/retractable parts to install the parts & accessories away from heat or block-objects; these all belong to current invention features so can let all light beam to emit to area(s) where need the illumination or-and project image or-and lighted patterns, Not like conventional LED bulb only can supply the near-by area(s) which start from the LED-bulb to certain limited distance areas (LED bulb has limited brightness to emit to long distance except like current invention to apply optics lens or lens assembly to project light beams to remote-away or far-away distance which current market items cannot create.

BRIEF DESCRIPTION OF THE DRAWINGS

FIG. 1A is use LEDs on-off time under pre-determined time and time period to change the light source at desired position, orientation related to image-forming unit(s) or to the said image carrier or-and project-lens(s) so can make the moving or-and changeable light image or-and light-patterns.

The alternative can make each of optic-lens fit inside the rotatable optic-lens holder or disc to make rotating or move by motor or movement or rotate device so also can make the image or-and lighted patterns has moving or changeable effects.

Figure 2A:
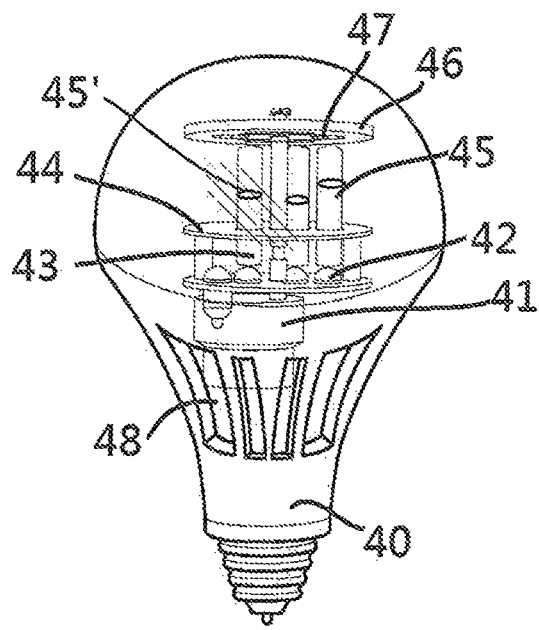
Figure 2B:
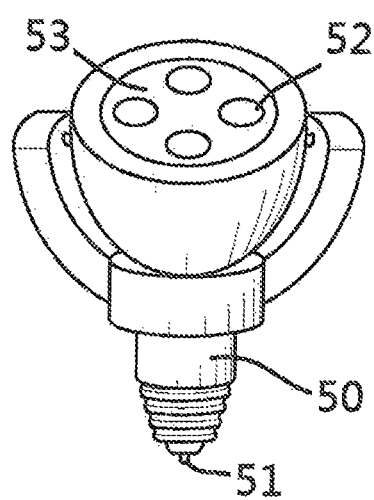
Figure 2C:
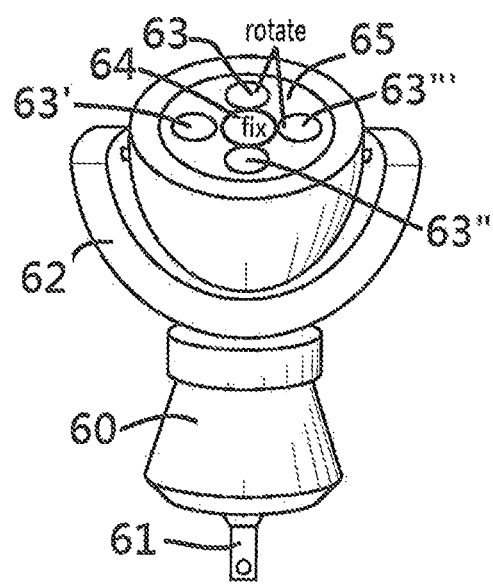
Figures 3, 3A, 3B:
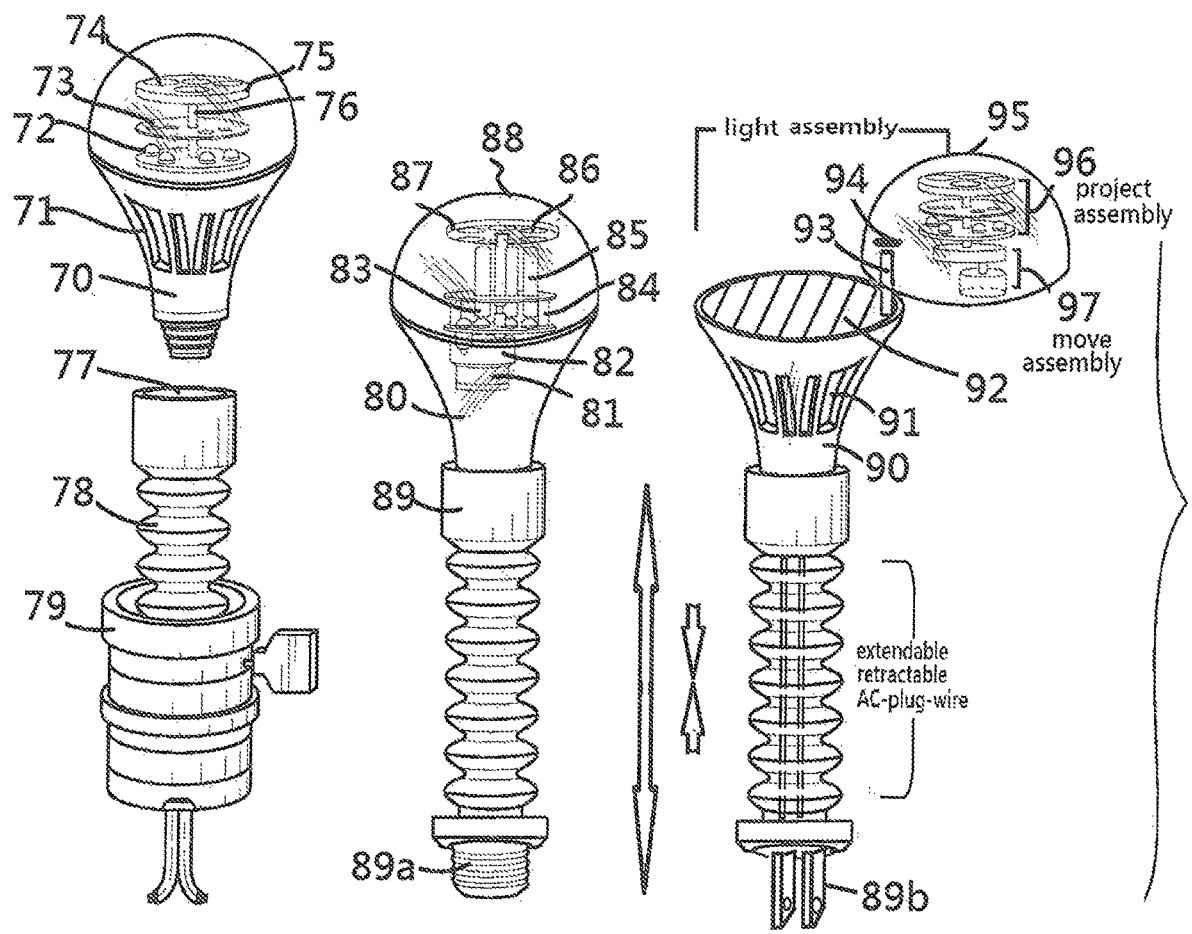

FIG. 3A use the magnetic & magnetic-coil with mechanical arms to make the image carrier to moving, shaking, swing to make the said big project image moved. Same as FIG. 2A alternative arrangement to make the said each of plurality of optics-lens installed inside the disc or holder or frame to move or rotate or shaking or waving to make the said lighted image or-and lighted patterns has moving or changing light performance.

Figure 1A:
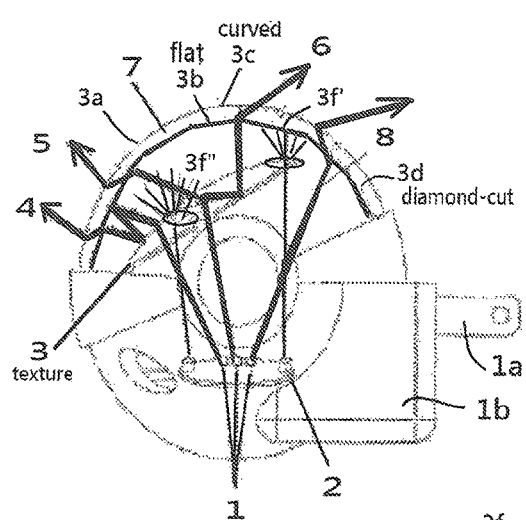
FIG. 1A and FIG. 1B and FIG. 1C: Disclosure the 3 embodiment has 3 basic components of the said project LED light which is a LED light has prong to get AC power source or has AC plug-wire to get AC power source, or has bulb-base to get power source from bulb-socket to create the wider viewing angle moving project image from the said 3 different different way to get moving effects of all kind of LED related lighting including the drawing shown is night light.
Figure 1B:
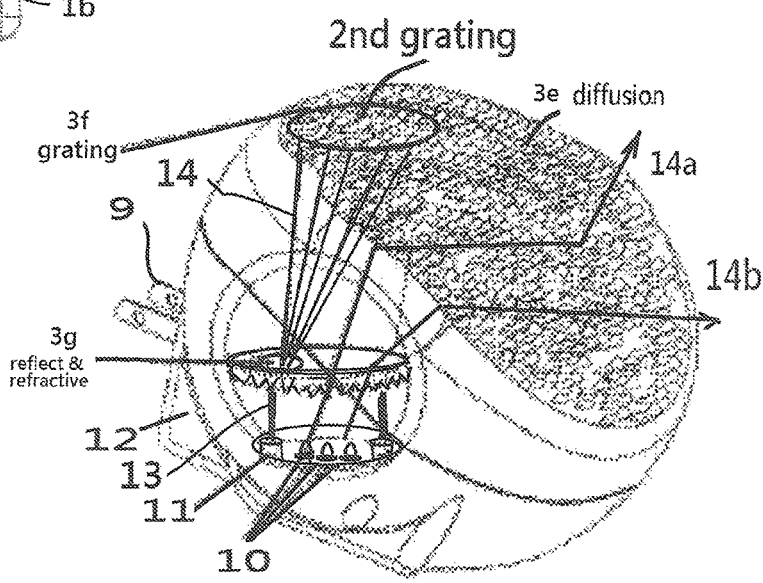
Figure 1C:
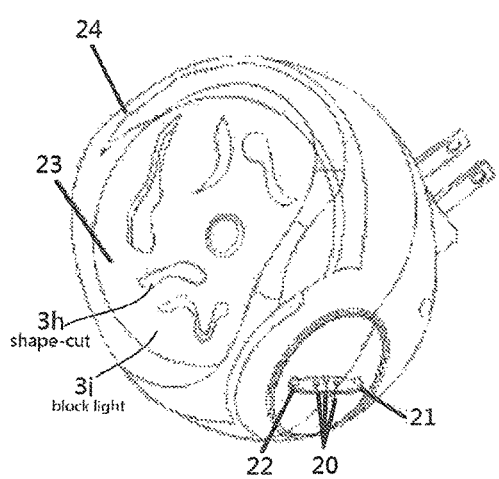
Figure 1D:
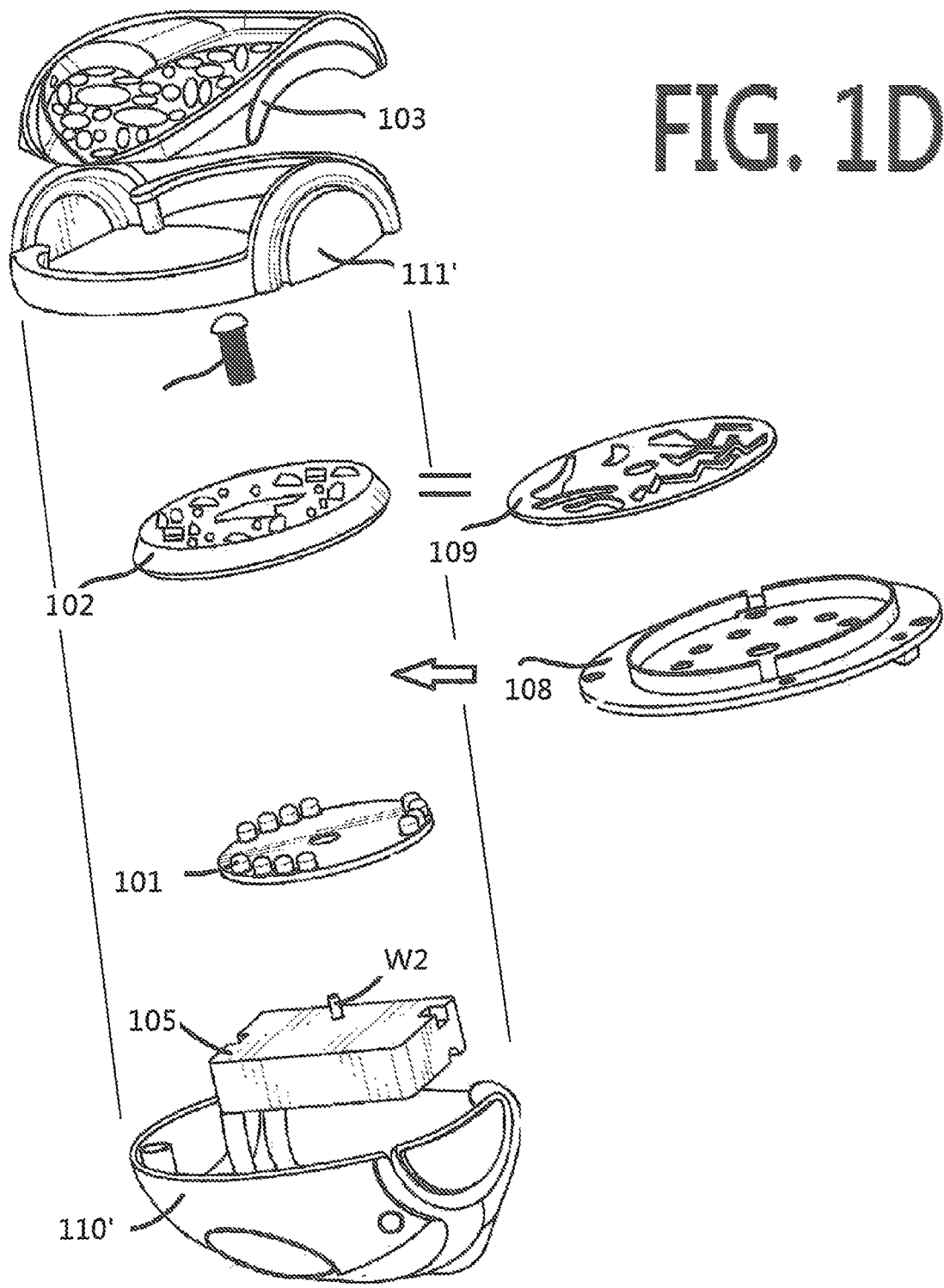
FIG. 1 and FIG. 1F: Disclosure the 1st embodiment of the said project image main construction for preferred projection assembly of LED light or LED outdoor or LED seasonal project light or LED Bulb has LED light source(s), image carrier(s), project-lens(s) these 3 basic components for most simple construction and low cost to form the big project image on desired location and emit out from the said LED related application and for all type of LED light or LED bulb.

FIG. 1D: Disclosure the FIG. 1B for details construction which has movement or motor on bottom with axis long enough to hold and rotate the said image carrier (alternative can said optics-lens) and also allow the LEDs and circuit board install near or along the axis so can allow LED(s) light beam passing through the optional added extra optic-lens which can change narrow LED light beam to wider and get parallel light beam to hit the top image-carrier. And light passing through the image-carrier's opening, cutout, windows, printed window, film, slide, texture, marking surface, variable thickness, or display or digital data display and go through the top project-lens which may in variety type including but not limited for one refraction-lens or multiple refraction-lens or refraction with reflection lens or any combinations from market available type lens or-and protective cover to create desired light effects. (This drawing same as co-pending filing (# ZZZ-3) U.S. application Ser. No. 14/503,647), FIG. 1E; Disclosure details of the embodiment of FIG. 1C which has the magnetic & magnetic coil sets to make the magnetic reaction force to pull and push the swing-arm's that built-in magnetic unit so can move the swing-arms swinging to make the image-carrier or project-lens to moving back-and-forth to simulate the sea wave moving effects while the optic-lens has wave or variable thickness or texture or arts. The LED light beam pass through the said sea-wave marking or texture or other desired treatments segment, or area, or surface of the said image-carrier and emit the tiny image to the top fixed or moving project-lens or lens-assembly disc with or without the top protective cover or piece to magnify and project the wider viewing angle and big size project image or-lighted patterns on the desire surfaces including wall, ceiling, floor or building or house or fence for indoor or outdoor application. The moving device here is by magnetic reaction force not from the motor, or movement, or rotate device, or spin devices.

FIGS. 2, 2A, 2B, 2C, 3, 3A, and 3B: Disclosure the other embodiment of the said LED bulb apply for down light, or entrance light, stair light, recess light applications such as FIGS. 2, 2A, 2B, 2C, and 2C for normal down light installations. Some of other LED Bulb which may has the block-object(s) from the ceiling, walls, lamp shade or some block-object(s) is made of cement, concrete, metal, porcelain, pottery or any material which will block out the electric wave, electric signal to transmit though to affect or interfere the LED Bulb operated by Wifi, Blue-tooth, internet, App software electric signal delivery so the current invention has different design (FIGS. 3, 3A, and 3B) has moveable-part(s such as retractable, extendable, spin, rotate, moving arms, snake house, hinge to move the LED Bulb's at least one level(s) away from (a) Heat (b) light traveling (c) electric signal transmitting (d) all other block-means related to the said LED. Also, show the LED light including these drawing show LED bulb has the top project-lens or protective-cover which has dome or half-ball or at least half ball or sphere or flat design to make different LED light which has the built-in rotating optics-lens which has plurality of optics-lens (here is 6) to rotating by below motor or equal function device and the image-carrier or-and LED is also install the proper position so the 3 basic project components is as all parent co-pending cases (# FF-4) (#FF-3) (# FF-2) (# FF-1) (#FF-2008) (#QQQ-3) (#ZZZ-4) (# ZZZ-4) (#ZZZ-2) (# ZZZ-1) (# ZZZ-2013) has same performance to make (1) one of plurality of image-carrier or optic-lens or LED to rotating.

(2) has rotatable device to make the optic-lens to move or change position.

(3) the movement by motor or movement or rotate unit or spin unit.

Figure 4:
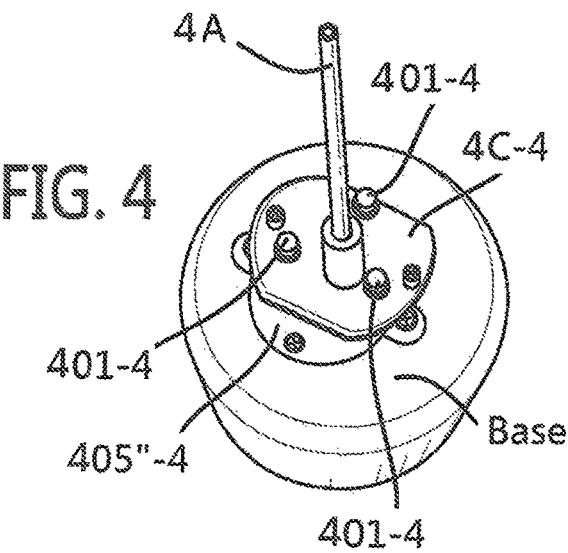
Figure 4A:
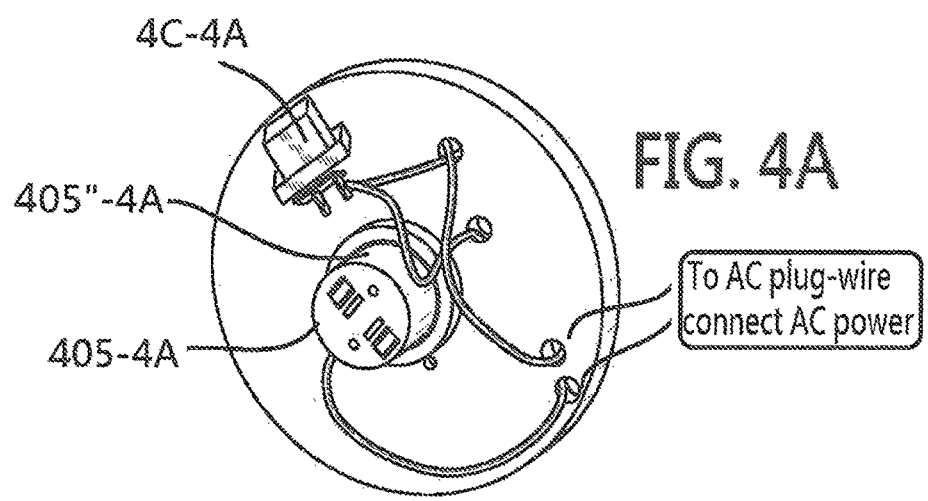
Figure 4B:
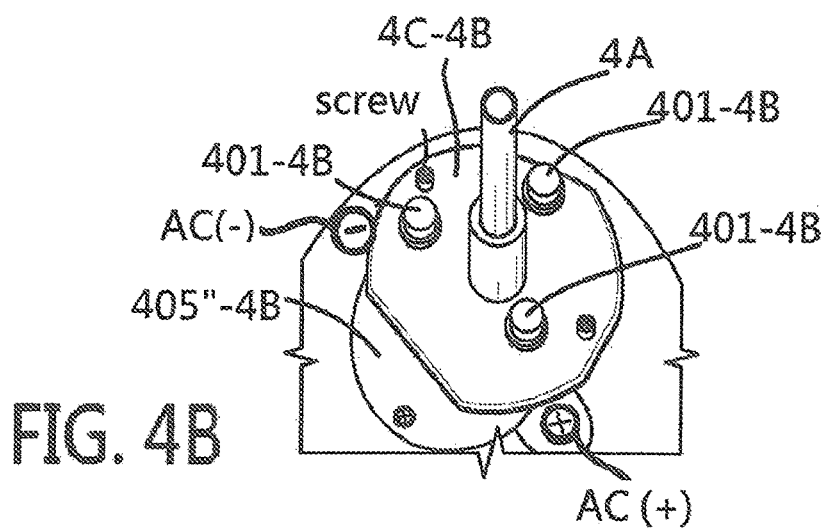
Figure 10:
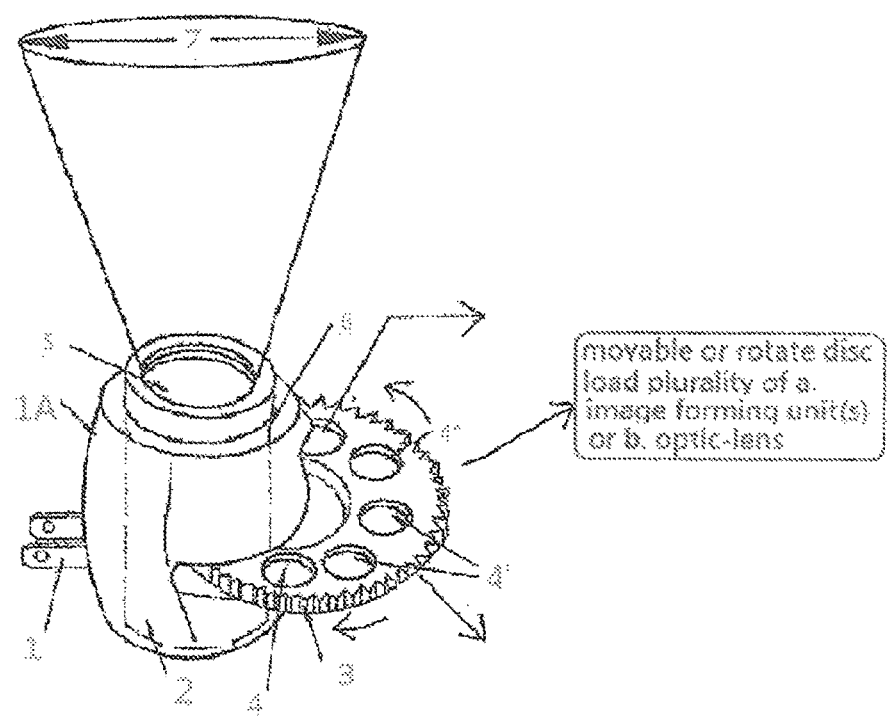
Figure 11:
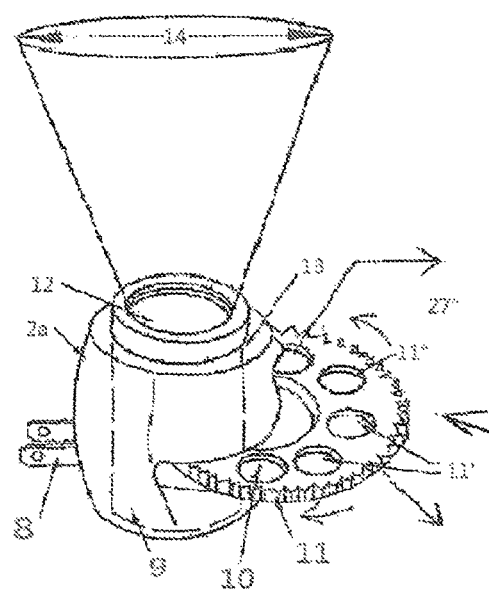
Figure 11A:
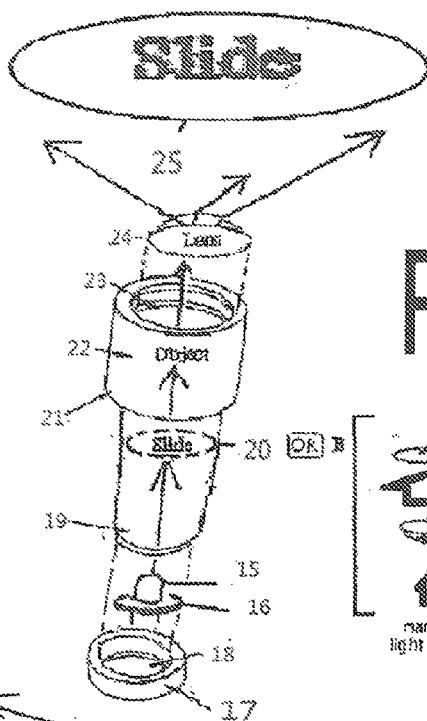
Figure 11B:
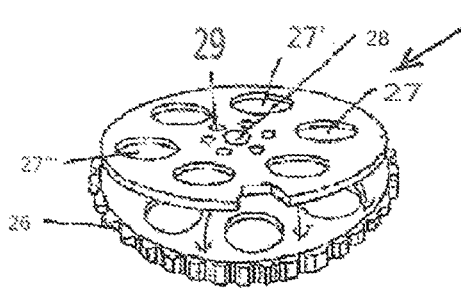

FIG. 4 and FIG. 4A, FIG. 4B disclosure the current invention co-pending filing (# ZZZ-1) U.S. application Ser. No. 14/323,318 which is Continue In Part filing of (# ZZZ-13) U.S. application Ser. No. 14/023,889 both is related to the wider area image or project image LED light with motor, or spin, or rotating kits to move the said top refractive or-and reflective optics-lens to project moving big image or lighted patterns.

FIG. 5A and FIG. 5B and FIG. 5C disclosure the preferred 5th embodiment which has the basic 3 main components including the LED(s), image carrier(s), project-lens for project-assembly as all co-pending filing related to one or more than one project filing cases. The current invention had motor, or movement to drive axis to rotating and rotate plurality of optic-lens fit inside of disc or optic-lens holder. And top of the motor has plurality of LED(s) as light source, the LED light beam emit through the image-carriers which has one or more than one film, slide, openings, printed windows, texture, marking, design, arts, variable thickness with or without the holder or disc which is not rotatable or moving. The lighted tiny image from the said image-carrier emit to the top fixed or steady or rotate or moving project-lens assembly which may be one or more than one optic-lens which is moving, rotate, spin to allow the tiny-image light beam to fall within the each project-lens surface from one part to other part to form the big project image moving on top ceiling or walls or floor or building or house or fence from angle N to N−1. The normally the angle depend on how many project-lens inside a round disc or round carrier or round holder. Such as 6 lens arranged on the disc as FIG. 5A, the each project-lens around 60 degree, the moving big project image also will show on the surface will has around same 60 degree from appear to dis-appear or other design so can get different desired image showing path and distance and direction. This embodiment all parts all fit within the said LED bulb housing parts.

From FIG. 5B disclosure the alternative arrangement for the rotating multiple project-lens install inside a disc or lens-holder or lens-carrier for lens-assembly which has a round holder to hold or fix the 6 project-lens each has around 60 degree or less so the big project image will move from appear to dis-appear around 60 degree on surface or other design for different image showing time and path and distance. The difference than the FIG. 5A is the light beam from LED(s) and image-carrier has the relatively and separate tube(s) or housing to position with each LED(s) and image-carrier in one section or one tube or in one housing so the each LED light beam output-end aim to the image-carrier very precisely to form lighted tiny-image, so the light beams from these 2 sections will not leakage too much to inside of the said housing and get much brighter and not interference image or lost-focus while some light beam spread out to other image-carrier or-and emit to the other optics-lens to cause image not clear enough.

From FIG. 6: Disclosure the light theory for the more than one project head or project-lens install within the disc or holder or carrier and this is similar as the co-pending filing that the one project night light or LED bulb has built-in multiple project-assembly like the co-inventor's U.S. Pat. No. 8,083,377 issued date Dec. 27, 2011 FIG. 15 and FIG. 16 has the multiple project heads to create multiple big project images on areas or surface. However, The current invention has plurality of the LEDs and top has common or individual image-carrier in one piece or many different film, or slide, or openings, or printed, or marking, or texture, or other treatment surface, or variable thickness, or windows, or stencils; to allow the LED light beam to pass through for form a lighted tiny-image to go through the top project-lens from number 1 to number N (N—can be same number of top project-lens of the disc or Holder) and from edge to other edge so can see the moving big project image from angle N-appear to Angle N-dis-appear. The current preferred construction just for example and not limited for other alternative or replaceable or same function or equal application.

It is appreciated all kind of alternative or replaceable or equal function or result or effects still fall within the current invention scope and claims.

FIGS. 7-9 are schematic diagrams illustrating optics principles utilized by the present invention.

FIGS. 10, 11, 12, 13, 14 disclosure the current invention co-pending filed case (# FF-4) for all PARENT FILED case on public file and show the each Figure of (#FF-4) has the disc or holder to install plurality of the image-carrier which is same of current invention to change to install plurality of the optic-lens into the disc or holder or compartment. Also show the claim very clear for "rotate device to rotate the optics-lens" which is same and identically for current invention for all kind of projection LED light, seasonal light, outdoor garden light and LED bulb which all these application has basic 3 components LED and image-carrier and project lens which has refractive function to enlarge and project out to outside arms away location including building or house or ceiling or walls for indoor or outdoor application.

FIG. 14 show the Parent filing case for (#FF-4) (# FF-3) (#FF-2) (#FF-1) and (#II-2009) (#II-II) is the (# Q-07) as above discussed so not discuss more details here.

The current inventions all drawing are same as above listed co-inventor co-pending or patent drawing with some change on the LED light or LED bulb including but not limited to has more than one level(s) and use more than one movable-parts can make the at least one level's parts or accessories to any desire location, position and orientation. Also, Each level(s) can has one or more than one functions selected from market available LED or LED(s) light effects, function, performance.

The current invention also teach the simple has 3 basic components LED and image-forming-unit or image-carrier with LED can get most economic cost and most simple installation for all said current invention and co-pending all parent filed case. Also, The current invention apply the basic project-assembly can apply to all kind of LED outdoor light, LED seasonal light, or garden light, or LED bulb has above discussed 3 ways to make the said LED or-and Image-carrier or-and optics-lens to move, rotating, spin to change the position and get the moving or changing image or lighted patterns effects.

So it is easily to refer all these concepts are same but belong to brand new while become the project LED light or LED bulb applications with all co-pending filing cases' features and concept. It is appreciated all listed co-pending or co-pending parent or co-inventor patented drawing, concept, feature or equivalent or same functions parts, or accessories, or electric circuit, or concept; all should be still fall within the current invention for projection LED light or-and LED BULB application.

DETAILED DESCRIPTION OF THE PREFERRED EMBODIMENTS

From the above background and drawing discussion, All drawing discussion should also part of details description so not copy into this details description again.

The current invention for LED night light or LED Bulb can present a continue moving big projection image to move within certain degree or arc-path from appear to dis-appear for angle or-and present multiple big project image on the surface at the same time.

The current invention co-pending filing cases already made a big improvement than conventional market available all kind of LED night light or-and LED bulb which only can offer near-by areas illumination not like the current invention NOT ONLY has more than one levels, parts, accessories can change position by moveable-means to make the inventor's LED night light or-and LED Bulb can overcome all kind of block-objects or items or trouble which may happened by (a) heat created by LED(s) or its circuit, electric components (b) light beam traveling hit or has the block-item to affect or interfere light traveling (c) signal delivery has block items to affect or interfere all kind of electric signal transmitting (d) other block items or objects or trouble to destroy the said LED desire functions, performance, effects BUT ALSO inventor's LED night light or-and LED bulb can use one LED night light or-and LED bulb to offer near-by and far-away illumination or image or both and the said night light or LED bulb also can has other features including but not limited from below, it is appreciated the current patent claims and scope should including above listed all filed case or pending cases of co-inventor including the idea, concept, construction, embodiment, drawing, box text should be for current invention's claim, scope, coverage;

(1) Multiple colors with changeable colors or-and moving effects
(2) Multiple functions select from market available any LED light effects for indoor and outdoor lighting
(3) Multiple controller or-and circuit or-and IC which select from market available controller, sensor, switch, blue-tooth, wifi, internet, app software, remote, infra-red or other electric or electronic related circuit or device(s)
(4) More than one movable-device or kits or assembly
(5) Changeable geometric shape
(6) Changeable construction or-and shape such as extend, transforming
(7) moveable device or kits or assembly may select from any group combination from bar, pole, spin, rotate, hinge, arms, joints, join, frame, connector, sections to make the levels, parts, accessories to be move away to desire location, positions. These are the main features of the current invention.

The co-pending filing cases already made said LED Bulb has more than one level(s) and has desire level(s) can change position, location, orientation to overcome any block-means to get the desire LED Bulb functions by variety type of moveable-device or kits or assembly. It also has movable lens, image forming piece, LED light source to make desired moving effects.

Also, The current invention co-pending filing cases already has more than one light beam emit out from LED bulb which under more than one controller or IC or other circuit or parts & accessories for the more than one of the functions for LED light or LED bulb which may selected from (a) power failure, (b) remote control, (c) Infra red controller, (d) blue-tooth, (e) communication with mobile phone, (f) Wifi, (g) internet communication or applications, (h) app software control, (i) motion or moving, photo or any kind of market available sensor to trigger at least one of the light beam of LED or LEDs to offer the light beam for illumination or-and project by the at least one of refractive or-and other optics-lens or-and other protective front or top cover, or-and protective or outdoor environment light can pass lens to form the image or-and lighted patterns to area(s).

Also, the co-pending filing cases also has (22) features as below listed:
1. An AC power source LED light has moving image or-and patterns project-assembly, comprising:
   at least one LED;
   at least one image-carrier;
   at least one projection-lens has at least refractive function for projecting an image or-and lighted-patterns when light beams emit from the at least one LED pass through the image carrier, and
   the at least one projection-lens increasing a viewing angle of the image or-and lighted-patterns while light device projects an enlarged image or-and lighted-patterns to a surface situated from the moving projection-image assembly of LED light device,
   wherein the at least one LED, image-carrier, and projection-lens that (a) fit within LED light device, or (b) are supported by one of a frame, support, parts and housing of LED light device,
   said frame, support, housing, or parts arranged or-and installed or built-in within a plug-in outlet LED light or LED bulb with AC bulb-base or AC plug-wire LED outdoor light; and at least one moving device for causing the projected enlarged image or-and lighted patterns to appear to move or change, and the at least one moving device or design for the said LED light device including at least one of:
   (a) a controller or-and IC or-and other circuitry for turning at least one or multiple LEDs on and off at desired times to cause the apparent motion or changing of the projected image;
   (b) a motor or time movement for causing movement of the (i) at least one image-carrier, or-and (ii) the at least one projection-lens or optics-lens, or-and (iii) LED or LED(s); to cause the apparent motion or changing of the projected enlarged image or lighted-patterns; and
   (c) a magnetic-unit and magnetic coil set for causing the movement of the (i) at least one image-carrier, or-and (ii) the at least one projection-lens. or-and (iii) LED or LEDs; to cause the apparent motion or changing of the projected enlarged image or-and lighted-patterns.

2. An AC power source LED light has moving image or-and patterns projection project-assembly, wherein the image carrier includes at least one printed window, film, slide, texture, treatments, variable thickness, marking, opening, cut-out, stencil, or display-unit that forms a relatively lighted small image as light beams emit from the at least one LED pass through the image-carrier, the relatively small image being enlarged by the at least one of fixed or moving projection-lens.

3. An AC power source LED light has moving image or-and patterns projection project-assembly, wherein the moving projection-image assembly is arranged to fit within or built-in an AC power source LED outdoor light, or LED Seasonal light device, or LED Halloween light device, or LED Christmas light device, for indoor or-and outdoor use.

4. An AC power source LED light has moving image or-and patterns projection project-assembly, wherein the moving projection-image assembly is arranged to fit within or built-in an LED bulb.

5. An AC power source LED light has moving image or-and patterns projection project-assembly, wherein the motor is coupled to a gear set to reduce a high motor speed to a relatively low speed for rotating the the at least one of or any combination selected from (1) image-carrier, or (2) projection-lens, or (3) LED, or (4) whole project assembly including LED and image-forming-unit and project-len.

6. An AC power source LED light has moving image or-and patterns projection project-assembly, wherein the at least one projection-lens is included in a projection-lens assembly rotated by the motor or movement at a predetermined speed.

7. An AC power source LED light has moving image or-and patterns projection project-assembly, wherein the at least one LED includes a plurality of LEDs or at least one LED arranged to emit a plurality of colors or more than one color.

8. An AC power source LED light has moving image or-and patterns projection project-assembly, wherein the at least one projection-lens is a single projection-lens mounted in a frame, holder, or disc.

9. An AC power source LED light has moving image or-and patterns projection project-assembly, wherein the at least one projection-lens includes a plurality of projection-lenses having different optical properties.

10. A plug-in night light or LED bulb has moving image or-and patterns projection-assembly, wherein said moving device causes said at least one projection-lens or-and image-carrier or-and LED(s) to undergo or operate at least one of the following motions: rotation, spinning, vibrating, shaking, and waving.

11. An AC power source LED light has moving image or-and patterns projection project-assembly, wherein said controller or-and IC or-and other circuitry creates said apparent motion or changing of the projected image or-and lighted patterns by causing the plurality of LEDs to sequentially flash, fade-in and fade-out, change colors, randomly turn on and off, or exhibit other LED light performances, effects, duration, or duty cycles.

12. An AC power source LED light has moving image or-and patterns projection project-assembly, further comprising another optics-lens having a areas or sections or parts or surface has texture or printing or marking or other market available treatment(s).

13. An AC power source LED light has moving image or-and patterns projection project-assembly, wherein said projection-image assembly includes a tube or tube assembly or housing or body having a narrow base/end and a relatively wider top/front to increase an area of light exiting out to desired locations.

14. An AC power source LED light has moving image or-and patterns projection project-assembly, wherein the projected image is one of a cartoon character, time, geometrically shaped image, logo, word, artwork, weather display, seasonal sign, seasonal related marking, seasonal sign, seasonal arts, or visible image, or-and lighted patterns or arts.

15. An AC power source LED light has moving image or-and patterns projection project-assembly, wherein the at least one projection-lens is included in a rotating assembly that causes the projected image to move along an pre-determined path, or arc path, or one side to other side, or from one side of a circle to the another side.

16. An AC power source LED light has moving image or-and patterns projection project-assembly, wherein the image-carrier is a fixed or-and rotating image-carrier having (i) shaped openings, cutouts, or (ii) printed windows or textured lens or marked lens, or treated lens, or (iii) the projection-lens assembly includes multiple projection-lenses.

17. An AC power source LED light has moving image or-and patterns projection project-assembly, wherein said light beams from the LEDs are pass through a first optic-lens having a textured surface, and has the at least one projection-lens is a second optics-lens having a relatively large size in (i) dome or sphere shape, or (ii) at least half ball or more than ½ ball or whole ball shape, or (iii) in a flat cover shape which only offer protection purpose; to refract or-and transmit light beams that have been traveled or-and dispersed by the textured or marking or art-added or treated or printed or stenciled or having image or having variable thickness surface of the first optic-lens.

18. An AC power source LED light has moving image or-and patterns projection project-assembly, wherein the at least one image-carrier is a fixed or-and moving image carrier having a plurality of printed windows, cutouts, textures, marking, printing, variable thickness, stencils, films, or slides, and h a s the at least one top or front projection-lens or protective-cover or protective-lens which is a relatively large size in shape of flat.

19. An AC power source LED light has moving image or-and patterns projection project-assembly, further comprising an outer cover or outer or top or front projection-lens or protective-cover having a round, semi-spherical, or spherical shape, or flat shape; to further enlarge the projected image or just protect the inner parts.

20. An AC power source LED light has moving image or-and patterns projection project-assembly, further comprising an additional optic-lens situated in front of the at least one LED for widening a narrow light beam emitted out from the at least one LED before it passes through the at least one image-carrier.

21. An LED outdoor or garden light for projecting a moving image or lighted patterns(s), comprising:
   at least one LED;
   at least one image-carrier;
   at least one projection-lens has at least refractive function for enlarge or-and projecting an image formed when light beams emit from the at least one LED pass through the image carrier, and
   the at least one projection-lens has at least refractive function to increase size and angle of tiny image or patterns within the image-carrier and to projects an pre-determined enlarged
lighted image or-and lighted-patterns to a surface situated at least an arm's length away from LED light; and
   The LED light has prongs or AC plug-wire or-and circuitry for connecting the
   at least one LED to a AC power source; and
   At least one moving device for causing the projected enlarged image or-and
      lighted-pattern for apparent moving or changing,
      wherein, the at least one moving device including a motor, time movement, or magnet and coil set for causing movement of the at least one or more than one parts of project-assembly selected from (i) image carrier or (ii) projection-lens, or (iii) LED or LED(s), and thereby cause the apparent motion or changing or moving effects of the projected image or-and lighted-pattern(s).

22. An LED bulb for projecting a moving image, comprising:
   at least one LED;
   at least one image-carrier;
   at least one projection-lens has at least refractive function for projecting an image or lighted-pattern(s) when light beams emit from the at least one LED pass through the image carrier, and
   the at least one projection-lens has at least refractive function to crease a size or-and angle of tiny size of the image-forming-unit or image-carrier's image or-and pattern(s) to a surface situated at least an arm's length away from LED bulb;
   The LED bulb has a bulb base including contacts or-and IC or-and circuitry for connecting the at least one LED to power source; and
   at least one moving device for causing the projected enlarged image or-and lighted patterns to appear to move or changing, and
   The at least one moving device including a motor, time movement, or magnet and coil set for causing movement of the at least one of (i) image-carrier, or (ii) projection-lens, or (iii) LED or LEDs; thereby cause the apparent motion or moving or change the projected image or lighted-pattern(s).

From above listed (22) details description for the current invention features for the 3 major parts which is the most simple construction than ever and can project a nice and clear moving or changeable lighted image or-and lighted-pattern for big size and visible for people and shown on house, building, fence, walls for outdoor use or even can apply to indoor while use the different conductive-system which may selected from the (1) prongs or (2) AC plug-wire, or (3) outside unit AC-to-DC transformer, or (4) built-in AC-to-DC circuitry, (5) DC power bank, or (6) DC power storage batteries and rechargeable from solar power. Or the power system can be any type available from market place.

The current project-assembly has 3 major parts to make it simple and low cost while the project assembly put into different housing with desired conductive system can be any projection light for different purpose which may be below applications while the housing design for different construction which is so simple just move the current invention discussed the 3 major parts into, then can come out many different LED light has project moving or fixed image or lighted-pattern which including at least below products;

a. LED Outdoor Garden projection light
b. LED Outdoor & indoor Seasonal project light
c. LED Outdoor & indoor Halloween or-and Christmas outdoor light
d. LED Indoor project light.
e. LED Project Flash light.
f. LED project LED Bulb.
g. LED security light
h. LED patio light
i. LED Seasonal light string.
j. LED Café light set
k. LED or Laser project light==While add extra Laser Light source
L. LED project ball
M. LED party light All above listed (A) to (M) application which apply the 3 major parts of the project-assembly with different installation or arrangement or housing with related parts as above listed the co-inventor's variety of the co-filed or-and co-pending or-and patent filed cases. It is appreciated these co-pending, parent filed cases listed above has the same or alternative or equal functions to apply the basic 3 parts of current invention of project-assembly should be Fall within the current invention and its parent filed cases' claims or-and coverage or-and scope without any argument. To add the extra parts, or extra lens, or extra accessories for all different housing or shape to form other product which has basic 3 major parts of current invention for LED light with moving, movement, spin, rotating to make the said project lens or-and image-forming-unit/image-carrier or-and LED(s) to move or to change position or location or orientation should still fall within the current invention scope or claims without argument.

Furthermore, the current invention also has (16) extra features as below listed:

Features 1:

The LED bulb has consist of:

At least one LED(s) as light source of said LED bulb which emit light beam to desire areas, locations with pre-determined illumination, function, time period, performance.

The said LED bulb has parts or accessories for desire group combination select from optic element(s), lens, adjustable focus assembly, twist kit, rotate kits, elastic contact end, more than one output light beam(s), rotating frame, bulb shade with arms for rotating/tile, more twist bulb base, support for shade, LED assembly, LED tubular parts, adjust kits, project element, digital data displayer, Lcos display assembly, LCD displayer, digital camera, data storage device or, data been projected by optics lens-set, sensor to control, switch, IC, circuit, extend assembly, extractable set, filter(s), stencil unit, cutout(s), painting piece, motion or moving sensor, Remote control system, blue tooth communication or download, Internet wireless application;

to make the said LED bulb emit the light beams, image, time, data, digital message, internet data(s) to desire near-by area(s) or remote-away distance area(s) for illumination.

The said LED bulb connect with power source by contact or-and conductive piece in preferred construction and configuration, and The LED bulb incorporate with electric parts & accessories to emit the light beam(s) to areas with adjustable angle cover to change the light emitting direction to preferred in x-y-z axis or any combination as required for preferred light performance, effects, functions.

The improvement including:

At one of the output light beam(s) from the said LED bulb can adjust direction to certain area(s), location(s), distance(s) while adjust above listed component(s) of said LED bulb.

The said base of LED bulb is male insert means to fit into the female receiving socket or bulb-base for desired construction.

The said LED Bulb at least has adjustable parts to make the said at least one of light beam can change position, direction, orientation.

Features 2: The LED Bulb as above listed (Feature #1), the said elastic contact means which allow the said LED bulb can adjust the said at least one of the light beam can be position, location, direction to certain area(s) in x-y-z axis.

Features 3: The LED Bulb as above listed (Feature #1), the said extendable, extractable means which is The parts can be extend away from the said LED Bulb and has certain configuration and construction to allow install some electric parts & accessories, sensor means, motion sensor means, remote control means, heat sensitive means within so can over come heat, light's shade, light's lens, light's curtain, light's glass, light's cover, cavity's depth, or any other block-item or trouble or objects.

Features 4: The LED Bulb as above listed (Feature #1), the said same light beam can incorporate with Optics elements, optics lens, optics lens assembly with parts & accessories to make the same light beam has different light performance.

Features 5: The LED Bulb as above listed (Feature #1), the focus adjust means can make same light beam to present different light performance on the certain location, position, area for desire brightness, size, performance.

Features 6: The LED Bulb as above listed (Feature #1), the said Bulb's frame, support kits which offer the Bulb can be twist, tilt, rotate, spin, adjust angle and with holder design to overcome any heat issues to make the said change desired angle.

Features 7: The LED Bulb as above listed (Feature #1), the said Base of LED bulb can be in any construction including screw type, pins type, poles type, multiple poles type, twist type, bayont type, conventional market type for current invention.

Features 8: The LED Bulb as above listed (Feature #1), the said More than one light beam output(s) which said the said LED bulb has more than one of the light beam(s) are emit to the location(s), area(s), position(s) which is remote-away from the said LED Bulb.

Features 9: The LED Bulb as above listed (Feature #1), the said LED assembly, LED tubular parts, Project element(s) the construction, parts & accessories which for LED light source so can make the certain LED(s) light beam do not leakage out and passing though the said optics parts, housing, optics lens, display unit, image, LCD display image, Lcos image, digital display can be emit out of said LED Bulb to get light beam or image to desire location, position, areas.

Features 10: The LED Bulb as above listed (Feature #1), the said sensor, switch, motion sensor, remote controller, blue tooth system, photo sensor or other market available electric parts & accessories incorporate the circuit or circuitry to make the said LED light source to emit light under predetermined light function, performance, effects.

Features 11: The LED Bulb as above listed (Feature #1), the said extend, retractable parts or kits or system can install the select electric parts & accessories, also the LED light source depend on the LED bulb application including up or down or horizon arrangement.

Features 12: The LED Bulb as above listed (Feature #1), the said LED Bulb can illuminate the areas including any combination of areas(s) which are near-by area(s), far-away area(s) or together for both near-by and far-away area(s) effects.

Features 13: The LED Bulb as above listed (Feature #1), the said LED bulb has more than one functions not only offer the illumination for near-by area or remote-away distance area(s) but also may incorporate with motion sensor, remote control, blue-tooth for other functions.

Features 14: The LED bulb consist of;

At least one LED bulb which has at least one LED(s) as light source to offer the illumination or image while the light source are connect with related circuit, or-and IC, or-and electric parts & accessories, or-and related switch, sensor(s), remote controller, blue-tooth system or set or equivalent trigger-kits.

The said LED Bulb has extend function to install the electric parts & accessories, extra LED, sensor means, controller, RF receiver, IR sensor, or other equivalent controller to overcome the LED(s) heat, or surrounding block-items or parts or block-trouble of lighting fixture's shade, cover, glass, frame, support, ceiling, wood piece, metal piece, plastic pieces.

The said extend or-and transform-set can extend to certain distance to away from LED(s) heat or any block-trouble(s) to allow the light beams or electric signal delivery direction without interfere by surrounding heat and block-items to let said LED bulb can has pre-determined function(s), Performance(s), Effects(s).

Feature 15: The LED bulb consist of:

At least one LED bulb which has at least one LED(s) as light source to offer the illumination or image while the light source are connect with related circuit, IC, electric parts & accessories and related switch, sensor, remote control, blue-tooth or equivalent trigger.

The said LED bulb supply the illumination or image to a remote-away areas(s) by angle, position, orientation, direction, focus adjust design or system while incorporated with optics elements, optics lens, project assembly, LED(s) assembly.

The said LED bulb emit the light beam to desire area(s) in preferred combination of near-by illumination, far-away illumination, near-by image, far-away image, digital data image, movie image, internet digital data image, time display, motion picture image, colorful image.

Feature 16: The LED bulb consist of;

At least one LED bulb which has at least one LED(s) as light source to offer the illumination or image while the light source are connect with related circuit, IC, electric parts & accessories and related switch, sensor, remote control, blue-tooth or equivalent trigger.

The said LED Bulb has more than one of light beam emit out from the said LED bulb for illumination or image.

At least one of the LED light beam are triggered by controller which may select from group combinations from motion sensor, remote control, Infra red sensor, Bluetooth system, power failure assembly which has build in direct current power storage unit(s), sensor, switch, or other electric parts & accessories.

Figure 2:
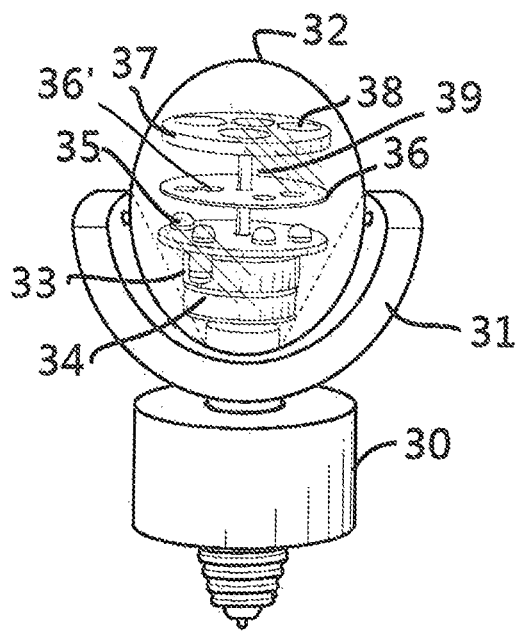
FIG. 2A is used motor or movement, spin, rotate, moving device to make the said image carrier(s) to moving to make the big project image to moving.

The current invention has very details notes on each drawing so here do not discuss details, please refer to attached drawing with brief description below:

FIG. 1 and FIG. 2: Disclosure the 1st embodiment of the said project image main construction for LED night light or LED Bulb has LED light source(s) (01), image carrier(s) (02), project-lens(s) or project-lens assembly (03) to form the big project image (not shown) on desired location and emit out from the said all LED light (including Night light) or LED bulb.

All the current invention or the co-pending applications of the said projection LED light all still use the optic theory of the FIG. 7 and FIG. 8 and FIG. 9 only different for the three main projection theory 3 major parts LED light source(s) (01), image carrier(s) (02), project-lens(s) or project-lens assembly (03) put on different location.

The said LED bulb or Plug-in AC outlet light has different construction, arranged fit on tube or housing parts, incorporated with IC or desired circuit, has motor/movement/spin/ rotating device to make the said 3 major parts to change position, or has track, groove, ditch to make the manual or automatically adjust the optic-lens to adjust the focus, or-and The said LED light or LED bulb has moving parts to allow adjust the project image angle or other features listed or discussed inside of all co-inventor's earlier applications cases. To get the moving image or lighted patterns can simple get by move at least one of the (1) LED or LEDs or-and
(2) Image forming unit which can be one of film, slide, texture lens, light block-out piece with shaped openings, cutout, windows, matrix, or-and
(3) incorporate with grating piece while the light source is laser light source, or-and
(4) the lighted patterns forming unit which can be a texture lens, wave thickness piece, diffuser lens, plurality of tiny-convex or concave lens-assembly, or-and
(5) other image or lighted patterns forming unit(s) available from market place so the light beam out of the LED(s) or-and laser light source(s) can pass through the image or-and lighted patterns forming unit(s) to emit into top or front cover or lens which has at least one of
a/refractive, or-and b/reflective, or-and c/protective, or-and d/split-light function, or-and e/diffuse light beam functions;
to create the desired image or-and lighted patterns.

From FIG. 1 the said Movement (05) which market available motor or movement or spin or rotating device, here preferred model is super silent noisy device which has axis (06) has elongate length to install the LEDs (01) its circuit or circuit board. The said LED (01) or LED assembly (01) or LEDs (01) which connect with the desired PCB (04') which has the electric parts & accessories to control the LEDs to has desired function including chasing, random, pair flash, sequential, random flash, fade-in and fade-out or any LEDs light function available from market place.

The LEDs position with the optional or preferred top position-board (08) which has walls can fit with the preferred or optional other optic-lens which main purpose is to make the each LED's narrow LED light beam to become wider viewing angle LED light beam so can cover to the as wider as possible wider range light beam can emit to the said image carrier (02) so can get shaped light beams to pass through the opening(s), printed window(s), cutout(s), films, slides, texture lens, variable thickness or other digital display-unit including storage or internet connected as co-pending (#TT series disclosure) on the said image carrier (02).

The shaped or tiny image light beam out from the said image carrier (02) will emit to the said top project-lens or project-lens-assembly (03) which can be a single project lens (03') or plurality of the optics-lens from into one assembly (03).

The project-lens or project-lens-assembly (03) has at least one optic properties is the refraction which can make the the lighted shaped or tiny-image light beam to wider viewing angle image has the desired brightness, color, image, shape, moving. The said or wider viewing angle project-image or lighted patterns including dot-matrix dots or points, cartoon, mixed color, stimulate nature scene, galaxy, star cloud, space image, stars or other image or lighted patterns (not shown) show on the certain distance away from the said LED night light/LED bulb or from the same construction put inside of products or fit into different outside housing such as into a LED light or LED bulb shape and connect with the circuit or-and power source from the LED light device or bulb's base or housing which the LED bulb base may be a update retractable contact point allow people to twist one more or more circles to let the some sensor or electric parts such as camera, Bluetooth, IR receiver can have desired direction, or position or orientation.

From FIG. 1, the Axis (06) of the movement (05) extend to top and install LEDs (01) and circuit board and top position board (08) with wall to install the optic-lens (09) and all these parts including LEDs (01), circuit board, top position board (08), optics-lens (09) all is not rotating for this embodiment. Only the image-carrier (02) is moving, rotating, spin with the said movement (05) axis (06) and speed can be design as wish. The alternative arrangement can make to move any combination select from group including LEDs (01), or-and image-carrier (02), or-and circuit board, or-and optional top position board (08), or-and optics-lens (09) to make different function and light effects.

The moving image carrier (02) will allow the below LED(s) (01) light beam to pass through the different one display-unit or image-forming unit, or different portion or section or area of the said image carrier (02).

And the shaped or tiny of image or light patterns' light beam will be come out from the openings, cutouts, film, slide, texture lens, variable thickness lens, printed windows to emit to the top plurality of optics-lens-assembly's (03) to create at least one of big viewing angle image or lighted patterns.

The optional top cover/front cover/outside parts or housing which has from more than 90 degree to 270 degree wider light can passing through project-lens or protective-lens with desired shape such as dome, sphere, ball, at least half ball so can project out from top top or front cover or parts or housing to outside areas or surface has a super big size of the project-image or lighted pattern(s) on the desired surface including ceiling, walls, floor, building, house, fence to show out (1) desired fixed or-and moving effects or (2) the said desired shaped or lighted tiny full color image or colorful desired lighted-beam assorted while the LED light beam emit through of the said image-carrier.

The said FIG. 1 shaped or tiny-image light beams while pass through the top plurality of optic-lens assembly project-lens which will be refracted the all shaped light beam to desired or random directions as pre-determined specification or function or light effects.

The said image-carrier (02) may has opening, shape hole, windows, printing piece, film, slide, texture, variable thickness, sand blaster, or any other market available image forming unit or lighted patterns forming unit or display unit. While the image-carrier (02) may has different shaped hole or stencil or variable thickness or treated lens or plurality of tiny-sections/areas/parts to form the lighted patterns or while the image carrier has shape openings or cutout or printed windows not film or slide so the lighted patterns can be look like the aurora effects with moving effects which are created by the moving image-carrier (02). This is the one of the application not limited to for other or alternative or equal construction to make variety of different treatment of the image-carrier to be rotated, spin, moving. The FIG. 1 the optic-lens (03) can be a variable thickness convex-lens which has different diameter or different thickness so can make a plurality of different lighted-patterns from one or multiple color LED light beams came out from one or more than one LEDs.

From FIG. 1F very similar with the FIG. 1 but the rotating or moving unit is the said Top Project-lens or project-lens-assembly (03') not same as the FIG. 1 to move or rotate the said Image carrier (02'). The FIG. 2 show the different arrangement or-and rotating/move/spin unit from the FIG. 1 show to move the said image carrier (02). The FIG. 2 show the moving unit change from FIG. 1 the said image-carries (02) to project-lens or project-lens-assembly (03') to form the different light effects. FIG. 2 to rotating the project-lens or project-lens-assembly (03') will get the lighted shaped or tiny-image out from the image-carrier to pass through the top each single optic-lens of the multiple optic-lens assembly so can get one by one image on the different location and look image or-and lighted patterns moving for certain degree. For FIG. 2 preferred embodiment has 6 optics-lens assembly (03') can get each image has around 60 degree moving arc or angle image. This has details design description on the FIG. 6.

Same as FIG. 1, the FIG. 1F embodiment has the 3 major components for LEDs (01') and Image-carrier (02') and Project-lens-assembly (03') all assembled with the below motor (05') and motor gear set (05"). The motor has very faster rotate cycles per minutes (RPM) so need one motor gear set (05") to reduce to preferred RPM so people will not see too quickly rotating or moving project-image feel bad. The LEDs (01') on this embodiment may or may not fit on the circuit board and LED(s) light beam emit through the optional position board (08') or other design frame (F), support (S), holder (H) or has the other optics-lens (not shown) to make the narrow LEDs light beam to become wider viewing angle LED light beam before to pass though the said the optional top of the LEDs position board (08') has the image carrier or treated lens or cartoon film/slide (02') which same as the FIG. 1 has the preferred shaped openings, cutouts, stencils, film, slide, display-unit so can allow the LEDs light beam to pass and emit the said lighted image or shaped or tiny-image light beam to the said each single project-lens of the 6 optic-lens assembly (03") to form the image or-and lighted patterns and because the each single project-lens (03") is rotating so the shaped or tiny-image light beam will go though one by one of the single optics-lens (03") to form the each of image show on different timing and travel for a pre-determined arc or angle so can form a continue moving for certain art or distance for same big project-image of each one image-forming display to shown on the surface.

From FIG. 1F, to rotate the said project-lens or project-lens-assembly (03') which has number of the single optic-lens (03") and while the shaped or tiny-image light beam has sufficient wider angle so can passing through the one or many of the said the single optic-lens (03") because optics-lens is rotating so the image will be same and the look like same image continue moving and show up. The said big size image travel or-and moving from one arc-position to other arc-position or-and from one circle side to other circle side. The moving direction can be clockwise or anti-clockwise which depend on the below motor or movement or spin device rotation direction.

The number of the variable thickness lens or treated lens or slide or shape hole or opening or cutout or printed window or film or slide or the display-unit and its related LED number to form the lighted shape or tiny-image or light patterns or light beam also will get the number of big project-image. More detail for the moving Project-lens or project-lens-assembly (03) for lighting effects shown on the FIG. 6 with more details.

From FIG. 1A show the co-pending filing case with the alternative way to create a wider viewing angle project-image on the surface. This embodiment use more than one optic-lens has at least one is refractive or-and refractive lens to make the LEDs light beams to pass though the 1st lens to get narrow LEDs light beam to become many of reflective or-and refraction light beams and the said many refraction light beams go through the outside $2^{nd}$ project or protective lens which has big arc or angle with preferred shape including (i) dome, half ball, or at least 1.2 ball, sphere those has desired optics properties including reflective or-and refractive or-and diffusing or-and convex lens or-and made with plurality of small sections/areas/piece to form a optic-function piece, or a sphere piece just for protection/environment/waterproof purpose only; or, even (ii) flat-piece for just protection purpose to make the more wider viewing angle project-images or-and lighted pattern(s) to shown on outside the LED light or LED bulb or LED garden light or other LED outdoor or LED indoor lighting device. The said $1^{st}$ lens may also has texture which can be a wave type and the LEDs can be more than one of blue-light and green-light or white-light LEDs with IC or-and controller to make the said LEDs color changing on desired time period with desired functions and speed and brightness may select but not limited for fade-in and fade-out, chasing, pair-flashing, random, automatically changing function, freeze function, sequential or other market available LED light functions still fall within the current invention's scope.

The FIG. 1A, the red, blue, green color 3 LED(s) or one LED has multiple color(s) while the light beam emit to the wave texture optical lens which is has received all the LEDs light beam and go through the wave texture refraction optic lens so came out many of the light beam and pass though the 2nd lens then can come out a lot of wave shaped blue, green, white project image. While the blue, green white LEDs are turn on and turn off on different time period and from $1^{st}$ red and $2^{nd}$ blue and 3rd blue or any mixed-colors LEDs for different percentage of light color and time, it can also with preferred fade-in and fade-out sequential, and LEDs arrangement with 1>2>3 or any of 1+2>1+3>2+3 or other any combination can created the many different assorted color like minimum 7 color of rainbow with more plus colors as pre-determined IC design and this different color assortment can operate front and back, then, can create the moving water wave effects so this is one example for creating moving effects but this embodiment use non-motor device to make a big viewing angle moving project-image is the one of the current and co-invention application features and should be fall within the current invention for moving project-image scope.

From FIG. 1B and FIG. 1D which FIG. 1B show the outside shape and FIG. 1D show the FIG. 1B details construction how to make the moving project-image like the said Aurora or any other preferred stimulate nature scene including galaxy, solar system or others which is similar or it is alternative or equal function or replaceable example as the said preferred embodiment of FIG. 1. The said FIG. 1 has the top or front or outside parts or housing which has sphere or at least ½ ball, dome or flat-piece which has wide arc or angle around 90 or 180 or 270 degree project/or protective/ or refractive/or-and reflective or-and diffusing lens which are formed by plurality of small area/segment/parts/piece variable lens thickness piece into a top/front/housing/Flat cover/Flat diffusion cover, the said top cover/front cover/ housing piece is similar or alternative or replaceable with the optic-lens like (F) plurality of small areas/segments/parts with different thickness convex lens to make the disusing function of the FIG. 1. and The said each small segment/areas/parts of one preferred optic-lens of FIG. 1 optic-lens (03) and each of plurality of the small segment/areas/parts has its focus and thickness and curvature of the lens so can make the plurality of the different reflective, refractive light effects.

The said inner construction as the above discussed FIG. 1, the main 3 components LEDs, image-carrier, project-lens-assembly as above discussion. The current invention and all the FIG. 1A, FIG. 1B, FIG. 1C, FIG. 1D, FIG. 1E has prongs or alternative or replacement or equal function to has different conductive kits available at market place such as bulb-base, AC wired with plug which use AC plug wire to connect with AC power source for LED garden light, LED outdoor light, LED indoor light also still fall within the current invention. The FIG. 1A, 1B, 1C, 1D, 1E show the LED light beam passing through the image-carries's image-forming unit or display unit or above discussed treated lens or others to become a big viewing angle projection night light, indoor or outdoor LED project light, LED bulb.

From FIGS. 2, 2A, 2B, and 2C while the same construction of the major 3 components fit into the Bulb shape housing with bulb-base can instantly become the LED Bulb has the moving project-image LED bub. Alternative or replacement or equal function to put the major 3 components into the garden light, outdoor garden light set, or any outdoor or indoor AC Plug wired products, or AC powered products with different prongs, bulb-base or other conductive parts to get AC power source still is same of the current invention to use simples and minimum 3 major parts can create a low cost with clear image for image or-and lighted patterns or-and moving or steady or fix projection device and has big and large size image or-and patterns show feet or arms away from the LED light device.

The one of embodiment to use AC power source come from wall outlet or from the bulb-base power source or from the AC plug wire, these just through the different conductive prong or conductive bulb base or AC plug wire set or other conductive piece. It is appreciated that all the current invention and all above listed co-pending cases claims, idea, concept, major components, construction and all alternative, replacement, equal functions should still fall within the current invention device scope, claim and appreciated also cover for LED plug-in night light or the LED bulb with conductive bulb base or AC plug wire LED outdoor projection light for all kind specification should be still fall within the current invention. So all the preferred embodiment has prong is equal has the bulb base and it also equal to use the AC plug wire to get the AC power source or conductive piece to get DC power source. The housing can be any geometric shape.

From FIG. 1C and FIG. 1D is outside shape and details construction show the other alternative way to get the moving project-image for LED night light or the LED bulb. Again, this is same as Co-pending filing case (#ZZZ-3) U.S. application Ser. No. 14/503,647 now is U.S. Pat. No. 9,719, 654 which apply the same 3 major components LEDs (01"), image-carrier (02"), and Project-lens assembly (03") to form the big viewing angle project-image.

The Alternative or replaceable or equal function arrangement for example to make moving function by electric magnetic force to pull or push the optic-lens or image forming unit or display unit or LED to make vibration, shaking, swing, waving, moving part (02B), arm (02B), pole (02B), craft (02B), axis (02B), bar (02B), pole (02B) connect with magnetic unit (02A) which will be affect or reaction to the said magnetic-coil device (02E) while the different current passing through the said magnetic-coil (02E) to create magnetic field and force to pull or push the magnetic-unit (02A) which may connected with LED or-and image forming unit(s) or optics lens for close or pull away to make the 3 major components to make moving in x or-and y or-and Z-axis for 3 dimensional movement to make desired functions.

The current invention is one of the embodiment but not limited for all the magnetic-unit will make the attached or connected or joint-together said moving part (02B), or arms (02B), or pole (02B), or craft (02B), or axis (02B), or bar (02B), or pole (02B) to be waving, shaking, swing, moving to make the any combination of (i) optic lens or (ii) image-carrier (02") has texture or without texture or-and (iii) LED(s) to be change position to make the said desired light effects.

The said Moving parts (02B) is assembled or attached on the 1st optic-lens or image carrier (02") at one end or side of two-sides-pole (02C) like the scale or weight-balance equipment so only need small magnetic force between the magnetic coil and magnetic parts can easily to make the scale or weight-balance construction to make the optics-lens or-and image-forming-unit(s) to move like incorporate with motor or movement has same or equal or replace purpose. while the moving parts (02B) is moving and also move the optics-lens or image-forming-unit two-sides-pole (02C) sit on the two side frame (02D) will be also change position the said 1st optic-lens or image-carrier (02") moving so make the image carrier or-and 1st optics-lens to emit the different light beam to the top project-lens or cover and form the big viewing angle project image on the desired floor, ceiling or walls but not shown on the wall where has the outlet or surface has the bulb base.

From FIGS. 2, 2A, 2B, 2C, 3, 3A, and 3B show the co-pending filing all kind of preferred LED bulb designs and shape. The inner may has the desired (i) moving optics-lens, (ii) moving image-carrier, (iii) moving LED(s) or-and (iv) different LED turn on and turn off time, (v) magnetic reaction force device, or (vi) single project tube device, or (vII) multiple piece of project tube-piece device, or (viii) project assembly inside these housing; to create or get the wide viewing angle moving project-image show on the surface. The drawings also show the LED bulb has its preferred construction or even incorporate with the bendable or flexible bulb-base as FIG. 3A or FIG. 3B which has long length of the bendable or flexible piece to make the people to make the project or illumination aim to desired position or location or orientation. From FIG. 3C also show the tilt or move horizon part of the LED bulb for more than one functions including project or moving projection or illumination for near by area.

From FIG. 4 and FIG. 4A, FIG. 4B disclosure the Co-pending Filing (#ZZZ-12) U.S. application Ser. No. 14/023,889 and (# ZZZ-1) Ser. No. 14/323,318. The (# ZZZ-12) U.S. application Ser. No. 14/023,889 those drawing show the 1st embodiment to use the said motor (05-4A) to drive the axis (A) to rotating the top project-lens which has multiple or pluralities small segments/areas/section and each has preferred refraction or-and reflection lens to allow the inner LEDs (01-4) (01-4B) to passing though the multiple or pluralities small segments/areas/section and each has preferred reflective or-and refractive lens to spread out the LED light beam. It also can have alternative arrangement that LED(s) has the different turn on and turn off LED which has single or color light beam to wide viewing angle for moving project-image.

The each color of the said LEDs (01-4) and (01-4B) can be different color and turn on and turn off controlled by IC so can had all kind of light effects including chasing, random, pair flash, fade-in and fade out, sequential, color changing, freeze function, auto changing function, 7 or up to tens of function in 1 or any other available function from market place.

The FIG. 4, FIG. 4A, FIG. 4B also has circuit (C-4) (C-4A) (C-4B0 and motor's gear set (05'-4) (05'-4A) (05"-4B) so can get desired rotating speed of axis (A) to drive the top multiple or pluralities small segments/areas/section and each has preferred reflective or-and refractive dome lens can rotating under predetermined speed to make people enjoy the moving and changeable color, function light effects from the said current invention for LED Night Light or LED Bub or AC plug wired outdoor light or garden light or outdoor project light while the same construction fit into or built-in (i) the plug-in Night light or (ii) the said Bulb shape with the bulb base or (iii) AC plug wired outdoor garden or outdoor project light or outdoor seasonal light which connect to AC Power source.

From FIG. 5A disclosure the Same construction with the FIG. 2 which has the Moving or Rotating optic-lens-assembly (03D) which has the 6 of the single optic-lens (03-1) which can project the shaped or tiny-image light beam through the refractive lens (03-1) to become big project-image shown on the desire surface. The current invention has the 6 single optical-lens arrange within a frame (F) for 360 degree so each single optic-lens (03-1) almost cover the 60 degree of the said frame (F). So the wide viewing angle project-image will moving also around 60 degree for arc or circle range while the top project-lens-assembly or protective lens each single project lens take 60 degree, then the big project image traveling will be around 60 degree. The alternative or replaceable or equal function to design the number of optic-lens on the frame or number of LED(s) or Number of the said image-forming-unit(s) with counter-wise or anti-counter-wise moving depend on the pre-determined design or market requirements still should fall within the current and above listed all co-pending filing scope and claims.

The said LEDs (01-1) has narrow viewing angle so may has optional Optic-lens (op-1 of FIG. 6) added or like FIG. 5B (02-2) to let the narrow light beam become wider viewing angle light beams or add the distance from the LED top to the image-carries but increase the distance for LED and image-forming unit will loose some light brightness. While the LEDs light beam emit to top the said image carrier (02-1) through the image carrier's (02-1) openings, printed windows, texture lens, variable thickness lens, printed piece, stencils, cutouts, films, slide, display-units or changeable image or display, the said lighted shaped or tiny-image light beam will emit to top single optical-lens (03-1) fixed on the said frame (F) of the said projection-lens-assembly (03D). The wider viewing angle the said shaped or tiny-image light beam go through the said each single optics-lens (03-1) and form the image because all the optic-lens (03-1) is rotating one by one so the each single optic-lens image will look like a continue moving same one image to moving from $1^{st}$ arc potion to $2^{nd}$ arc position of from circle one side to other side for certain degree depend on the each single optic-lens (03-1) occupy how many angle of the said frame (F).

The FIG. 5A, the image carrier (02-1) has 4 shaped opening, holes, cutout, printed windows, film, slide, display-unit, texture-lens, variable thickness, changeable display windows so can project 4 different images if had relatively LED for the said 4 different tiny-images that is openings, holes, cutout, printed windows, film, slide, display-unit, changeable display windows to create the 4 big project-image and rotating on all same direction or desired directions. The alternative or replacement or equal function still fall within the current invention scope and claims.

From FIG. 5A the LED (01-1), Image carrier (02-1), project lens assembly (03-1) and single optics-lens (03-1) and motor (05A) and gear set (05"-1) all fix or arrange or assembled near or along the axis (A) with desire frame (F) or install or fix on the housing parts (not shown) so whenever the outside housing changed but use same 3 major components with the current invention, The products can instant to become new products for example the products can be (i) LED night light or (ii) LED bulb or (iii) any AC plug wired or AC-to-DC outside transformer or AC-to-DC built-in circuit of AC power outdoor light, garden light, or seasonal light which has project functions still fall within the current invention.

and each products of above listed has 3 major components for simple construction and low assembled cost but can get clear and enlarge clear image or lighted patterns and those had its prong or Bulb base or AC plug wire or AC-to-DC transformer or AC-to-DC circuit to get the AC power for outdoor lighting or garden light or seasonal light has project function still fall within the current invention scope and claims.

From the FIG. 5B same as the all co-inventor and co-pending LED project light has the same LEDs (01-2) and image-carrier (02-2) and Project-lens assembly (03-2) with single optic-lens (03D) and only the said project-lens-assembly is rotting along the axis (A). The said LED night light or LED bulb or LED outdoor/seasonal/project light can has optional tube or tube assembly or housing or light parts to install the said other optional optic-lens to wider the narrow LEDs light beam and also use the tube or tube-assembly or housing or parts to prevent from the light beam leakage so can concentrate all LED wide light beam to deliver or emit or cover as many as single optic-lens. Or, The Tube or tube-assembly or housing or parts has optional or extra optic-lens to make the narrow LED light beam to become wider before emit into image-forming-unit and also can prevent from the light leakage out. This depend on the market requirements so this FIG. 5B is for just concept for optic-like tube which can be in any shape such as wider top and narrow end type of optic-like tube or tube-assembly (Not shown).

From FIG. 5C show the alternative way the image-carrier is a film or slide which fit into the optic-like tube or tube-assembly which may straight or wider-top-narrow-base optical-tube which has light-block-out to made of or reflective material coated outside so no light can leakage to outside and LEDs may also into the one end of the optic-like tube or tube-assembly and the film or slide is install within the optic-like tube inside by groove, holder, ring. So the lighted shaped or tiny-image light beam or pattern(s) can get maximum brightness to emit to top rotating or fixed single optic-lens (03-3) and create fixed or moving rotating certain degree multiple big projection image such as STARWAR characters, Frozen character or any Disney Characters or cartoon, time, logo, art work . . . etc.

From FIG. 6 show the 3 main components LEDs (01-LED), image carrier (02-ImCa), project-lens-assembly (03-PL) to make the wider viewing angle big moving project image. The said LEDs (01-LED) has its relatively top image carrier (02-ImCa) so can has the shaped or tiny-image light beams to emit to the project-lens-assembly (03-PL) each single project-lens to get the continuously moving clear and big project-image to travel certain arc or degree of the circle with wide viewing angle to viewer.

The LEDs (01-LED) has narrow light beam as right hand side of FIG. 6 for narrow light beam (N1) through the optional added other optic-lens (OP-1) or optics-like tube (OP-1) can become wider (W2) and passing through the image carrier (02-ImCa) with some distance to get the More wider (W3) shaped or tiny-image light beam to emit to project-lens-assembly (03-PL) to form the continuously moving big project-image (04-MBPI). The more LEDs (01A, 01B, 01C, 01D) and its image-carrier (04A) can get more moving big project image but it will reduce the travel arc or degree shown on the desired area/surface/locations. The moving big project image (04-MBPI) the moving direction for clock-wise or anti-clock wise will be depend on the motor and its gear-set direction. The moving big projection image (04-MBPI) moving angle will depend on the number of single optics-lens (04E) number within the 360 degree of holder or frame. More single optics-lens (04E) will has less traveling arc or angle of the said moving big project image (04-MBPI). For the FIG. 6, the 6 single optic-lens (04E) within the 360 degree frame or holder, the moving big project-image (04-MBPI) will travel around 360/6=60 degree. Whenever has more single optic-lens (o4E) inside of the frame (F) will get less travel arc or angle. Also, the less openings (04B), cutouts (04C), printed windows (04D), film (04B), slides (04E) will get less type/design/shape/image of the moving big project-image (04-MBPI). Also, If only had one top single optic-lens with one printed-window, the one continue moving big project image (04-MBPI) will move very slow because the axis rotate 360 degree only had one single optic-lens can project image for around 180 degree. So the moving big project image (04-MBPI).

From FIG. 7, FIG. 8, FIG. 9 show the basic physic theory for refraction image which preferred to use for the current invention to project the tiny or small image or light-patterns of the image-forming-unit or display-unit(s) or treated-lens or film/slide/opening/holes/cutouts/chartoon/characters/words.

FIGS. 10, 11, 12, 13, 14 disclosure the current invention co-pending filed case (# FF-4) for all PARENT FILED case on public file and show the each Figure of (#FF-4) has the disc or holder to install plurality of the image-carrier which is same of current invention to change to install plurality of the optic-lens into the disc or holder or compartment. Also show the claim very clear for "rotate device to rotate the optics-lens" which is same and identically for current invention for all kind of projection LED light, seasonal light, outdoor garden light and LED bulb which all these application has basic 3 components LED and image-carrier and project lens which has refractive function to enlarge and project out to outside arms away location including building or house or ceiling or walls for indoor or outdoor application.

FIG. 14 show the Parent filing case for (#FF-4) (# FF-3) (#FF-2) (#FF-1) and (#II-2009) (#II-II) is the (# Q-07) as above discussed so not discuss more details here.

The invention claimed is:

1. An LED outdoor light for projecting images or patterns, comprising:
at least one projection assembly, including more than one LED incorporated with an image carrier including selected from a film, piece with an opening, printed piece, slide, textured lens, variable thickness lens, treated lens, or marked lens, and a projection-lens having at least a refractive function and/or other optics properties,
wherein parts of the projection-assembly are built-in, fitted in, or installed in a frame, support, or housing parts and arranged to create a wider viewing angle and/or a big size projected image on a ceiling, walls, floor, building, house, ground, or desired surface situated at least an arm's length away from the LED outdoor light;
at least one moving device incorporated with the projection-assembly and including at least one of the following: (i) one of a motor, time movement, or magnetic-unit and magnetic-coil set, and (ii) one of a controller, IC, or a sensor, to control turn-on and turn-off the more than one LED,
wherein the moving device causes at least one of (a) at least one of the LEDs, (b) the image-carrier or a holder having a plurality of image carriers, and (c) a projection lens or holder having a plurality of optics lenses to move, rotate, swing, wave, shake, spin, or change position to cause said big size projected image and/or lighted-patterns to move, wave, rotate, spin and/or changing position, color, focus, or brightness functions.

2. The LED outdoor light for projecting images or patterns as claimed in claim 1, wherein the light beams emitted by the at least one of the LEDs to pass through a printed window, film, slide, opening, cut-out, stencil, or display-unit of the image carrier to form shaped or tiny-image light beams, which are emitted to the projection lens to form a wider viewing angle projected image.

3. The LED outdoor light for projecting images or patterns as claimed in claim 1, wherein the projection-assembly fits into an LED plug-in night light.

4. The LED outdoor light for projecting images or patterns as claimed in claim 1, wherein the projection-assembly fits into the LED bulb.

5. The LED outdoor light for projecting images or patterns as claimed in claim 1, wherein the motor has a gear set to change a high motor speed to a desired lower speed to rotate at least one of the image carrier, the projection lens and the projection assembly.

6. The LED outdoor light for projecting images or patterns as claimed in claim 1, wherein the movement has a desired rotational speed and the image carrier is one of a fixed, replaceable, detachable, movable unit that fits within a slot, opening or receiving space in the LED outdoor light body.

7. The LED outdoor light for projecting images or patterns as claimed in claim 1, wherein the projection assembly has additional optics lenses in a fixed, rotatable, or extendable and retractable arrangement to further widen a narrow light beam emitted by the at least one LED or to create desired light effects.

8. The LED outdoor light for projecting images or patterns as claimed in claim 1, wherein the more than one LED includes different colored LEDs or at least one LED with multiple colors controlled by the IC.

9. The LED outdoor light for projecting images or patterns as claimed in claim 1, wherein the projection lens contains more than one separate optics lens fitted into a fixed or rotatable or replaceable frame, holder, or disc.

10. The LED outdoor light for projecting images or patterns as claimed in claim 1, wherein the projection lens has more than one optics lens combined or injected to form one big projection-lens or projection outer cover that has a plurality of different refraction and reflection properties.

11. The LED outdoor light for projecting images or patterns as claimed in claim 1, wherein at least one of an inner projection lens or an outer optics cover is rotated by a motor, gear set, and assembled with a rotatable axle.

12. The LED outdoor light for projecting images or patterns as claimed in claim 1, wherein the image carrier includes at least one of a printed window, film, slide, opening, cut-out, stencil, optic-lens, prism-lens and display-unit.

13. The LED outdoor light for projecting images or patterns as claimed in claim 1, wherein the moving device rotates, spins, moves, vibrates, shakes, and/or waves the at one projection lens and/or the image carrier to cause the projected image or patterns to move, wave, spin, change position, or adjust focus.

14. The LED outdoor light for projecting images or patterns as claimed in claim 1, wherein the LEDs are controlled by an IC controller to change color, brightness, on-off time, duration, or duty cycles and to offer chasing, random, sequential, fade-in & fade-out, color changing, freeze color, freeze function or other LED light functions.

15. The LED outdoor light for projecting images or patterns as claimed in claim 1, further comprising another optic-lens or optics outer cover including texture, printing, or a refractive function.

16. The LED outdoor light for projecting images or patterns as claimed in claim 1, wherein the projection assembly has a tube, tube assembly, optic-like tube, or wide top-narrow base optics lens to enhance at least one LED's light effects.

17. The LED outdoor light for projecting images or patterns as claimed in claim 1, wherein the image carrier is a fixed, replaceable or changeable that fits at least partially into a slot or body opening of the light device, and the images or patterns are one of a steady and/or rotating cartoon character, time, geometric shape image, logo, word, artwork, weather information display, or vision image.

18. The LED outdoor light for projecting images or patterns as claimed in claim 1, wherein the big moving projected image is created by rotating the projection lens to obtain a continuously moving image that moves from one side to the other side along an arc or circle or curve.

19. The LED outdoor light for projecting images or patterns as claimed in claim 1, wherein the image carrier is a fixed, replaceable or changeable image carrier that fits at least partially into a slot or body opening of the LED outdoor light and that is one of a steady and/or rotating image-carrier which has shaped openings or cutouts or printed windows, and light beams from the more than one LED pass through the image carrier to form shaped light beams that then pass through multiple differently-refractive optics-lenses that act as projection lenses to form a wider viewing angle projected image.

20. The LED outdoor light for projecting images or patterns as claimed in claim 1, wherein the big moving projected image is created by IC controlled LEDs to provide different turn-on and turn-off times.

21. The LED outdoor light for projecting images or patterns as claimed in claim 1, wherein the big moving projected image is created by shaking a textured optics lens that acts as the image carrier by magnetic-reaction with a magnetic-coil device to pull or push a bar, crank-shift, or tube.

22. The LED outdoor light for projecting images or patterns as claimed in claim 1, wherein the big moving projected image is created by moving the image carrier to cause light beams emitted by the at least one LED to pass through a plurality of printed windows, cutouts, stencils, films, or slides of the image carrier and then through a flat top refractive projection lens.

23. The LED outdoor light for projecting images or patterns as claimed in claim 1, wherein the big moving projected image is created by an outside cover or outer projection lens that forms a round or at least partially spherical optics lens.

24. The LED outdoor light for projecting images or patterns as claimed in claim 1, wherein the projection lens is made up of a plurality of single optics lenses and an outer cover, dome, or top-piece with or without optics-properties.

25. The LED outdoor light for projecting images or patterns as claimed in claim 1, further comprising an optics lens in front of the LED for changing a narrow LED light beam into a wider light beam.

26. The LED outdoor light for projecting images or patterns as claimed in claim 1, further comprising an optics lens in front of the LED for forming desired light patterns.

\* \* \* \* \*